(12) United States Patent
Kien et al.

(10) Patent No.: US 12,465,725 B2
(45) Date of Patent: Nov. 11, 2025

(54) ACTUATOR FOR WIRE STEERED DEVICE

(71) Applicant: MEACOR, INC., Ayer, MA (US)

(72) Inventors: Tai Kien, Groton, MA (US); Toufic Azar, Montreal (CA); Ahmad Hijazi, Beirut (LB)

(73) Assignee: MEACOR, INC., Irvine, CA (US)

( * ) Notice: Subject to any disclaimer, the term of this patent is extended or adjusted under 35 U.S.C. 154(b) by 917 days.

(21) Appl. No.: 17/640,791

(22) PCT Filed: Oct. 7, 2020

(86) PCT No.: PCT/IB2020/059433
§ 371 (c)(1),
(2) Date: Mar. 4, 2022

(87) PCT Pub. No.: WO2021/070092
PCT Pub. Date: Apr. 15, 2021

(65) Prior Publication Data
US 2022/0331559 A1   Oct. 20, 2022

Related U.S. Application Data

(60) Provisional application No. 62/912,848, filed on Oct. 9, 2019.

(51) Int. Cl.
*A61M 25/01* (2006.01)
*A61B 17/00* (2006.01)

(52) U.S. Cl.
CPC .............. *A61M 25/0147* (2013.01); *A61B 2017/00327* (2013.01)

(58) Field of Classification Search
CPC .......... A61M 25/0105; A61M 25/0133; A61M 25/0147; A61B 1/0057
See application file for complete search history.

(56) References Cited

U.S. PATENT DOCUMENTS 5,364,351 A    11/1994   Heinzelman et al.
7,308,964 B2   12/2007   Hara et al.
(Continued)

FOREIGN PATENT DOCUMENTS

WO    WO-9426347 A1    11/1994
WO    WO-9833429 A2    8/1998
(Continued)

OTHER PUBLICATIONS

Written Opinion of the International Searching Authority issued by the World Intellectual Property Organization on Feb. 11, 2021 for PCT application PCT/IB2020/059433 from which the present application claims priority.
(Continued)

*Primary Examiner* — Laura A Bouchelle
(74) *Attorney, Agent, or Firm* — William A. English; Vista IP Law Group LLP

(57) ABSTRACT

An actuating assembly (10) for a wire steered device (12) provided with at least one steering wire (14). The actuating assembly (10) includes a body (22) for mounting the wire steered device (12), an axle (38) mounted to the body, a wheel (24) mounted to the axle and including a wire attachment (96) for attaching the steering wire (14) thereto with the steering wire (14) wound around at least part of the wheel (24), and an actuator (34) for selectively rotating the axle (38). The wheel (24) is movable between configurations in which the wheel (24) is either rotatable about the axle (38) or fixed in rotation relative to the axle (38).

10 Claims, 28 Drawing Sheets

(56) References Cited

U.S. PATENT DOCUMENTS

| | | | |
|---|---|---|---|
| 7,942,884 B2* | 5/2011 | Vahid | A61B 17/0487 606/232 |
| 2007/0255102 A1* | 11/2007 | Maruyama | A61B 1/0057 600/149 |
| 2016/0193449 A1 | 7/2016 | Sarabia et al. | |
| 2017/0035993 A1 | 2/2017 | Quinn et al. | |
| 2018/0028048 A1* | 2/2018 | Simmons | A61M 25/0105 |

FOREIGN PATENT DOCUMENTS

| WO | WO-2004096015 A2 | 11/2004 |
|---|---|---|
| WO | WO-2019079392 A1 | 4/2019 |
| WO | WO-2021070092 A1 | 4/2021 |

OTHER PUBLICATIONS

International Search Report issued by the World Intellectual Property Organization on Feb. 11, 2021 for PCT application PCT/IB2020/059433 from which the present application claims priority.
EP20874195.9 Extended European Search Report dated Feb. 22, 2024.

* cited by examiner

ACTUATOR FOR WIRE STEERED DEVICE

FIELD OF THE INVENTION

The present invention relates to the general field of surgical devices, and is more particularly concerned with an actuating assembly for wire steered devices, such as flexible catheters or tubing provided with a steering or bending mechanism.

BACKGROUND

Flexible catheters may be steered by pulling on wires extending from outside the body of a patient to the tip of the catheter, located in the patient. These wires are usually provided pairwise. Pulling on one of the wires from the pair while letting go of the tension in the other wire from the pair steers the tip of the catheter towards the wire to which tension is applied. To work properly, the wires must be pulled under a specific tension for a certain distance. Assembly of catheter steering devices is relatively difficult as these devices are relatively small, and if the proper tension is not achieved, steering will be at best difficult, if not impossible. Also, such steering devices are often relatively large and complex, and thus relatively expensive to manufacture and inconvenient to use.

Accordingly, there exists a need for improved actuating assemblies for steering a flexible catheter. An object of the invention is to provide such actuating assemblies.

SUMMARY OF THE INVENTION

In a broad aspect, there is provided an actuating assembly for a wire steered device, the wire steered device being provided with a first steering wire protruding therefrom, the actuating assembly comprising: a body for mounting the actuating assembly and the wire steered device to each other; an axle mounted to the body and defining a rotation axis; a first wheel mounted to the axle so as to be rotatable about the rotation axis, the first wheel including a wire attachment for attaching the first steering wire thereto with the first steering wire wound around at least part of the first wheel; an actuator operatively coupled to the axle for selectively rotating the axle about the rotation axis; the first wheel being movable between a first wheel mounting configuration, wherein the first wheel remains on the axle while being rotatable about the rotation axis independently of the axle, and a first wheel actuating configuration wherein the first wheel is mounted to the axle and jointly rotatable along therewith about the rotation axis; wherein in the first wheel mounting configuration, the first wheel is rotatable about the axle to wind the first steering wire therearound and tension the first steering wire to an operational tension when assembling the actuating assembly and the wire steered device to each other, and in the first wheel actuating configuration, the first wheel and the axle are jointly rotatable by the actuator to wind and unwind the steering wire on and from the first wheel to steer the wire steered device.

There may also be provided an actuating assembly wherein the first wheel is at axially different locations along the axle in the first wheel mounting and actuating configurations.

There may also be provided an actuating assembly wherein the axle defines axle teeth and the first wheel defines first wheel axle engaging teeth, the axle teeth and first wheel axle engaging teeth engaging each other in the first wheel actuating configuration to force joint rotation about the rotation axis of the axle and first wheel, and the axle teeth and first wheel axle engaging teeth being disengaged from each other in the first wheel mounting configuration to allow rotation about the rotation axis of the first wheel independently from the axle.

There may also be provided an actuating assembly wherein the axle teeth face radially outwardly from the axle and the first wheel axle mounting teeth face radially inwardly towards the axle, the axle teeth extending axially only along part of the axle.

There may also be provided an actuating assembly wherein the axle defines a radially protruding flange, the flange defining the axle teeth, the axle teeth facing longitudinally towards the first wheel and the first wheel axle mounting teeth facing longitudinally towards the axle teeth.

There may also be provided an actuating assembly wherein each of the axle and first wheel mounting teeth defines a respective perpendicular face extending in a plane extending substantially radially relative to the rotation axis and a respective slanted face angled relative to the perpendicular face, the perpendicular face of each axle teeth abutting in a parallel manner against the perpendicular face of a respective one of the first wheel mounting teeth in the first wheel actuating configuration, the perpendicular faces being oriented such that force transmission between the axle and the first wheel when the axle is rotated by the actuator occurs through the perpendicular faces when the axle is rotated in a direction leading to winding of the first steering wire around the first wheel.

There may also be provided an actuating assembly further comprising a biasing element biasing the first wheel towards the first wheel actuating configuration through a biasing force, the first wheel being movable to the first wheel mounting configuration by pushing against the biasing force, the slanted faces being configured and sized to that rotation of the first wheel in a direction leading to loss of contact between facing perpendicular faces allows the slanted faces of the axle teeth and of first wheel mounting teeth to slide relative to each other to move the first wheel away from the actuator teeth to reach the first wheel mounting configuration.

There may also be provided an actuating assembly further comprising a second wheel mounted to the axle so as to be rotatable about the rotation axis, the second wheel including another wire attachment for attaching the second steering wire thereto with the second steering wire wound around at least part of the second wheel, the first and second steering wires being wound respectively around the first and second wheels in opposite directions; the second wheel being movable between a second wheel mounting configuration, wherein the second wheel remains on the axle while being rotatable about the rotation axis independently of the axle, and a second wheel actuating configuration wherein the second wheel is mounted to the axle and jointly rotatable along therewith about the rotation axis.

There may also be provided an actuating assembly wherein in the second wheel mounting configuration, the second wheel is rotatable about the rotation axis independently of the first wheel.

There may also be provided an actuating assembly wherein the first and second wheels are movable respectively to the first and second wheel mounting configurations independently from each other.

There may also be provided an actuating assembly wherein the first and second wheels are movable respectively to the first and second wheel mounting configurations simultaneously.

There may also be provided an actuating assembly wherein the first and second wheels define respectively first and second wheel coupling teeth facing longitudinally towards each other, the first and second wheel coupling teeth engaging each other when the first and second wheels are in the in the first and second wheel actuating configurations so that the first and second wheels are jointly rotatable about the rotation axis.

There may also be provided an actuating assembly wherein one of the first and second coupling teeth are recessed female teeth and an other one of the first and second coupling teeth are protruding male teeth.

There may also be provided an actuating assembly further comprising a lock for selectively locking the first and second wheels in the first and second wheel actuating configuration.

There may also be provided an actuating assembly wherein the lock includes a lock pin that is selectively mountable on the first axle adjacent the first wheel by snapping to the first axle in a lock groove defined in the first axle, the first wheel being allowed to move to the first wheel mounting configuration when the lock pin is removed from the first axle, and the first wheel being restricted in the first wheel actuating configuration when the lock pin is mounted to the axle in the lock groove.

There may also be provided an actuating assembly wherein the lock includes a spacer selectively insertable between the first and second wheels, the first and second wheels being allowed to move to the first and second wheel mounting configurations when the spacer is absent from between the first and second wheels, and the first and second wheels being restricted in the first and second wheel actuating configurations when the spacer is mounted to the axle between the first and second wheels.

There may also be provided an actuating assembly wherein the lock includes a lock ring screwable on the axle, the first and second wheels being restricted in the first and second wheel actuating configurations when the lock ring is screwed to a locking position on the axle, and the first and second wheels being allowed to move to the first and second wheel mounting configurations when the lock ring is unscrewed and moved to an unlocking position on the axle.

There may also be provided an actuating assembly further comprising a resiliently deformable ring extending between the axle and the body and frictionally engaging the axle and the body.

There may also be provided an actuating assembly wherein the ring is compressed between the axle and the body to provide frictional resistance to rotation of the axle relative to the body while allowing rotation of the axle relative to the body when a predetermined minimal torque is exerted by the actuator on the axle.

There may also be provided an actuating assembly wherein the axle is restricted to rotate about the rotation axis along only a predetermined angular range relative to the body.

There may also be provided an actuating assembly wherein the wire attachment of the first wheel includes a mounting aperture provided in periphery of the first wheel for receiving the first steering wire therethrough, and a ferrule securable to the wire, the ferrule being larger in diameter than a minimal diameter of the mounting aperture.

There may also be provided an actuating assembly wherein the first wheel defines a groove extending circumferentially along at least part of first wheel in prolongation of the mounting aperture for receiving the first steering wire thereinto.

There may also be provided an actuating assembly wherein the actuating assembly includes a knob provided outside of the body and operatively coupled to the axle for rotating the axle when the knob is rotated.

There may also be provided an actuating assembly wherein the knob and the axle are coaxial and angularly fixed relative to each other.

There may also be provided an actuating assembly usable with a wire steered device provided with third and fourth steering wires protruding therefrom, the axle being a first axle and hollow, the knob being a first knob and defining a knob passageway extending therethrough and leading into the first axle, the actuating assembly further comprising: a second axle effective portion mounted to the body and extending along the rotation axis; third and fourth wheels mounted to the second axle effective portion so as to be rotatable about the rotation axis, each of the third and fourth wheels including a respective wire attachment for attaching respectively the third and fourth steering wires thereto with the third and fourth steering wires wound respectively around the third and fourth wheels in opposite directions; a second knob provided adjacent the first knob; a second axle link extending between the second knob and the second axle effective portion through the knob passageway and the first axle, the second knob coupling the second axle link link and the second axle effective portion so that the second knob and second axle effective portion are jointly rotatable.

There may also be provided an actuating assembly wherein the knob and the axle are coupled to each other through a gear assembly.

There may also be provided an actuating assembly wherein the gear assembly includes a planetary gear transmission.

There may also be provided an actuating assembly wherein the gear assembly includes a knob gear jointly rotatable along with the knob and an axle gear jointly rotatable along with the axle and meshing with the knob gear, the knob gear and the axle gear being rotatable about parallel offset rotation axes.

In another broad aspect, there is provided a wire steered assembly, comprising: a wire steered device provided with first and second steering wires protruding therefrom, the wire steered device being mounted to the actuating assembly as described above and operatively coupled there to so that the wire steered device is steered when the actuator is actuated.

In yet another broad aspect, there is provided a method of assembling a wire steered assembly including a wire steered device provided with first and second steering wires protruding therefrom and an actuating assembly including a body, an axle mounted to the body and defining a rotation axis, first and second wheels mounted to the axle so as to be rotatable about the rotation axis and an actuator operatively coupled to the axle for selectively rotating the axle about the rotation axis, the method comprising: mounting the wire steered device and the body to each other; mounting the first steering wire to the first wheel so that the first steering wire winds around the first wheel in a first direction; mounting the second wire to the second wheel so that the second wire winds around the second wheel in a second direction opposite the first direction; securing the first steering wire to the first wheel so that removing the first steering wire from the first wheel by pulling on the wire steered device is prevented; rotating the first wheel relative to the axle until the first steering wire is taut; securing the first wheel to the axle so that the first wheel and the axle are jointly rotatable; securing the second wire to the second wheel so that removing the second wire from the second wheel by pulling on the wire steered device is prevented; rotating the second wheel relative to the axle until the second wire is taut; and securing the second wheel to either the axle or the first wheels so that the second wheel and the axle are jointly rotatable.

There may also be provided a method wherein securing the first wheel to the axle includes moving the first wheel from a mounting position along the axle wherein the first wheel is rotatable about the axle to an actuating position along the axle wherein the first wheel engages the axle through mechanical interference. There may also be provided a method further comprising locking the first and second wheels to the axle so that the first and second wheels are maintained in the actuating configuration.

Advantageously, the proposed actuating assembly is relatively easily assembled with the wire steered device when compared to existing actuating assemblies, while remaining relatively cost effective to manufacture. Moreover the present invention facilitates achievement of a proper tension in the steering wire to eliminate backlash or slag by allowing fine adjustment at each wheel after the wire has been attached.

Other objects, advantages and features of the present invention will become more apparent upon reading of the following non-restrictive description of preferred embodiments thereof, given by way of example only with reference to the accompanying drawings.

DETAILED DESCRIPTION

Figure 14:
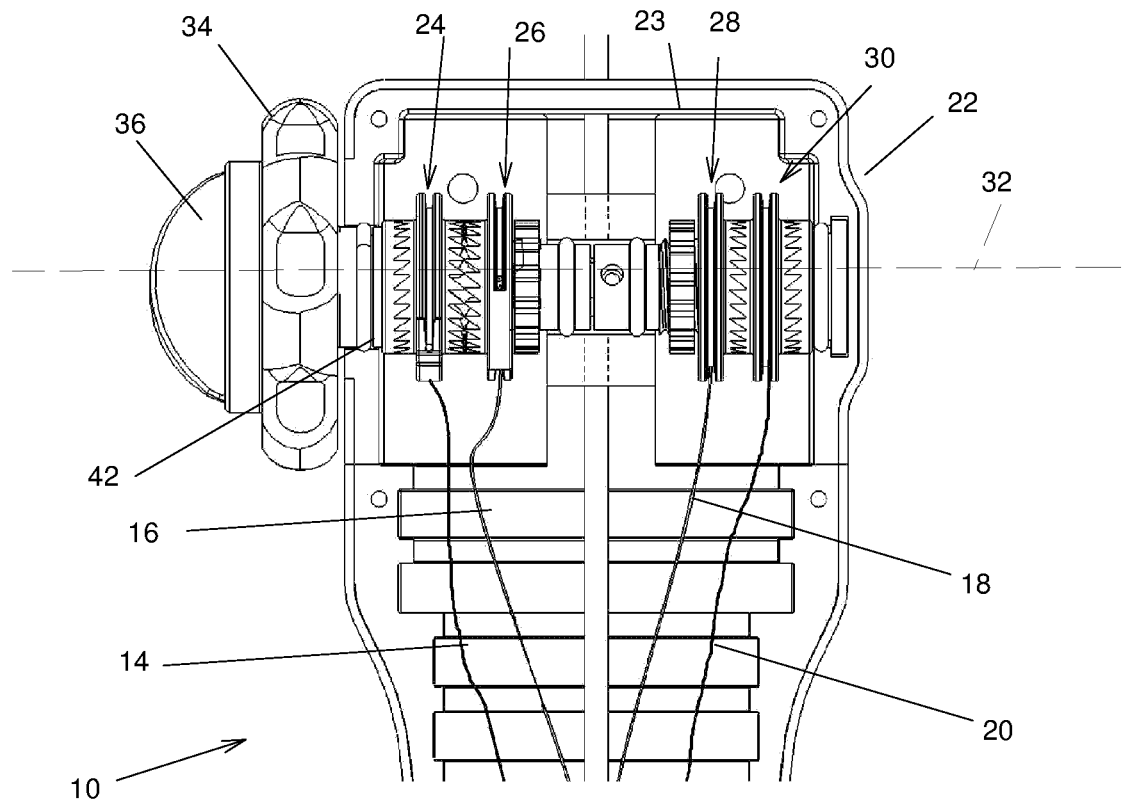
FIG. 14, in a top elevation view with parts removed, illustrates an actuating assembly including the steering assembly of FIG. 1.
Figure 15:
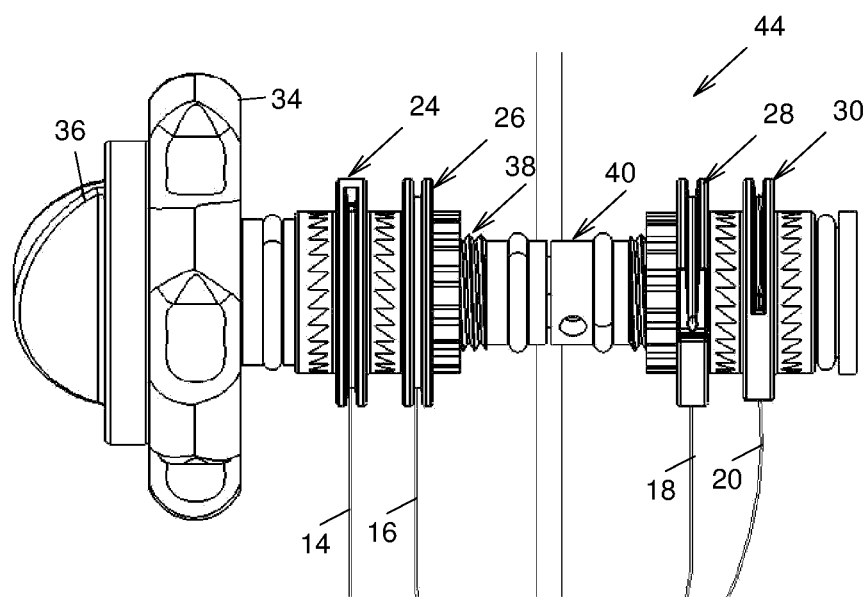
FIG. 15, in a top elevation view, illustrates the steering assembly of FIG. 1 with steering wires secured thereto.
Figure 45:
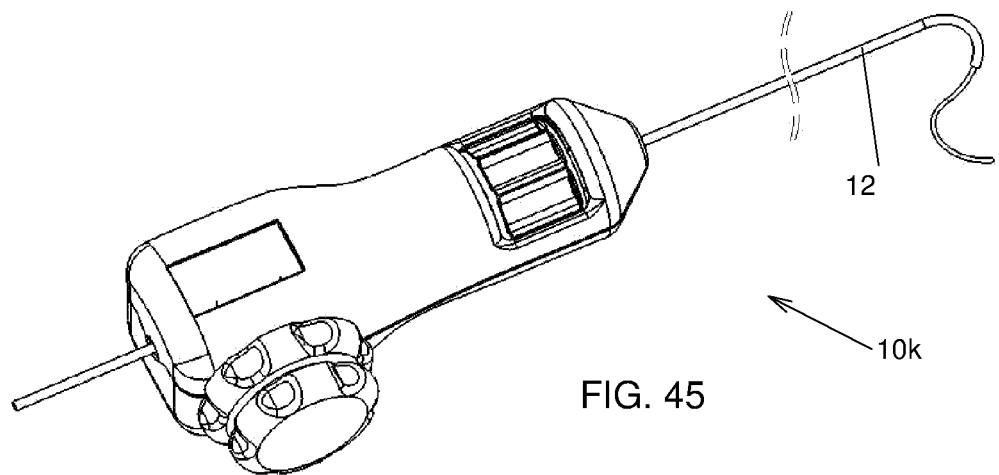
FIG. 45, in a perspective view, illustrates the steering assembly of FIG. 42 mounted to a wire steered device.

FIGS. 1 to 16 show various aspects of a first embodiment of an actuating assembly 10. Referring to FIG. 14, there are shown components of an actuating assembly 10 for a steerable catheter 12 (shown in FIG. 45, for example). The steerable catheter 12 is an example of a wire steered device usable with the actuating assembly 10. Other similar devices that are steered or deviated by pulling on one or more wires, similarly to the steerable catheter 12 are also example of wire steered devices usable with the actuating assemblies described herein.

The steerable catheter 12 is provided with at least one pair of steering wires 14 and 16 reaching the actuating assembly 10. In some embodiments, as seen in FIG. 14, another pair of steering wires 18 and 20 part of the steerable catheter 12 is also present. However, using a single pair of steering wires 14 and 16 in the actuating assembly 10, or in alternative actuating assemblies operating using similar principles, is within the scope of the invention. Also, in yet other alternative embodiments, only one steering wire is provided. For example, movement in a direction opposite to the direction in which movement occurs when one pulls on the single steering wire is caused by a spring back force, among other possibilities. In other embodiments, if the catheter 12 is small in diameter and/or has a very flexible tip, it is possible to steer in 2 directions by pulling and "pushing" the same wire. In some embodiments, this is facilitated by a non-round wire, such as a flat wire. The steering wires 14, 16, 18 and 20 are conventional in many aspects, in that they are used to steer, or bend, the distal end (opposite the actuating assembly 10), or any other suitable portion, of the catheter 12. In some embodiments, the steering wires 14 and 16 steer the catheter 12 in a first plane, while the steering wires 18 and 20 steer the catheter 12 in a second plane, which may be orthogonal to the first plane. In other embodiments, the steering wires 14 and 16 steer the catheter 12 in at a first location therealong, while the steering wires 18 and 20 steer the catheter 12 in at second location therealong, longitudinally spaced apart from the first location. Such catheters 12 are known in the art and any such suitable catheter or similar device may be used with the actuating assemblies described in the present document.

In the present document, the terminology distal and proximal refers to the location relative to an operator (not shown in the drawings) using the actuating assembly 10. Distal elements are closer to the end of the catheter that is insertable in the patient, while proximal elements are closer to the actuating assembly 10. This terminology is used to facilitate the description of the actuating assembly 10 and should not be used to restrict the scope of the present invention. Also, the terminology "substantially" and "about" is used to denote variations in the thus qualified terms that have no significant effect on the principle of operation of the actuating assembly 10. These variations may be minor variations in design or variations due to mechanical tolerances in manufacturing and use of the actuating assembly 10. These variations are to be seen with the eye of the reader skilled in the art.

The actuating assembly 10 includes an actuating assembly body 22 defining an actuating assembly cavity 23 thereinto. The catheter 12 is provided at a distal end of the actuating assembly body 22 and mounted thereto so that the steering wires 14, 16, 18 and 20 have proximal ends thereof inside the actuating assembly cavity 23.

Wheels 24, 26, 28 and 30 are mounted in the actuating assembly cavity 23 and each receive a respective one of the steering wires 14, 16, 18 and 20 that it is mounted or secured thereto, for example using a wire attachment described in further details below. The number of wheels 24, 26, 28 and 30 is equal to the number of steering wires 14, 16, 18 and 20 to mount thereto. The wheels 24, 26, 28 and 30 are pairwise coaxial relative to each other, and typically all coaxial relative to each other so that they are rotatable about a common rotation axis 32. The steering wires 14, 16, 18 and 20 are mounted to the wheels 24, 26, 28 and 30 so that the steering wires 14, 16, 18 and 20 within a pair steering the catheter 12 in a given plane are wound about respective paired wheels 24, 26, 28 and 30 in opposite directions.

For example, when seen from the side of the actuating assembly body 22 to which first and second knobs 34 and 36, described in further details below, are provided, the steering wire 14 is wound counterclockwise around at least part of the wheel 24, the steering wire 16 is wound clockwise around at least part of the wheel 26, the steering wire 18 is wound counterclockwise around at least part of the wheel 28, the steering wire 20 is wound clockwise around at least part of the wheel 30. All directions refer to a direction leading towards the free end of the steering wires 14, 16, 18 and 20, that is the end of the steering wires 14, 16, 18 and 20 that protrudes from the wire steered device 12 to attach to the wheels 14, 16, 18 and 20.

The wheels 24, 26, 28 and 30 are rotated about the rotation axis by one of more actuators. For example, the actuator takes the form of a motor operatively coupled to at least two wheels 24 and 26 or 28 and 30 to selectively rotate the two thus coupled wheels jointly, for example by rotating an axle, further described below. In other embodiments, as seen in the drawings, the actuators takes the form of knobs, such as the first and second knobs 34 and 36 provided outside of the actuating assembly body 22 are mounted thereto so as to be rotatable about the rotation axis 32. Typically, the actuator is operatively coupled to the axle for selectively rotating the axle about the rotation axis 32. The first and second knobs 34 and 36 may be provided on the same side of the actuating assembly body 22, as seen in FIG. 14, on opposite sides of the actuating assembly body 22, or at any other suitable location relative to the actuating assembly body 22.

The actuating assembly 10 is configurable to an actuating configuration in which the first and second knobs 34 and 36 are operatively coupled respectively to the wheels 24 and 26 and to the wheels 28 and 30 so that the wheels 24 and 26 may be jointly rotated selectively clockwise or counter-clockwise by the first knob 34 and the wheels 28 and 30 may be jointly rotated selectively clockwise or counter-clockwise by the second knob 36. Such rotations will shorten the portion of one of the steering wires 14, 16, 18 and 20 that protrudes outside of the actuating assembly body 22 and lengthen the corresponding portion of the other steering wire 14, 16, 18 and 20 within a pair, which in turn will steers the catheter 12.

Figure 2:
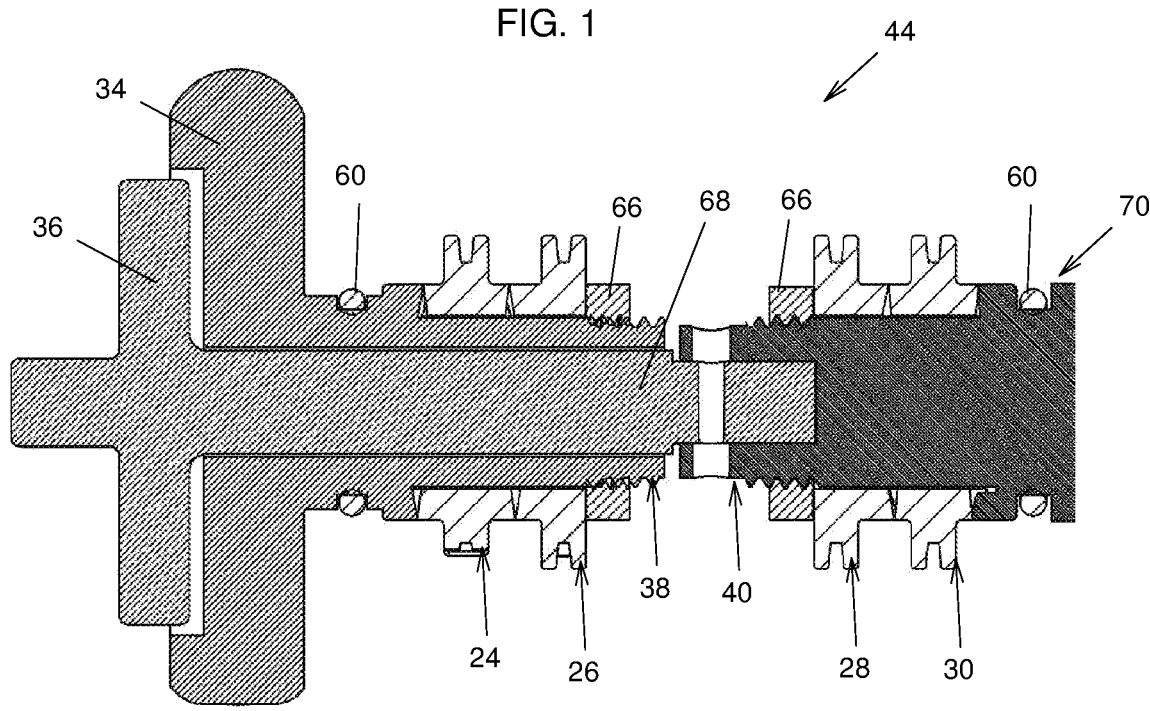
FIG. 2, in a longitudinal cross-section view, illustrates the steering assembly of FIG. 1.

Typically, coupling between the first and second knobs 34 and 36 and the wheels 24, 26, 28 and 30 is performed through first and second axles 38 and 40 coupled respectively to the first and second knobs 34 and 36, as seen for example in FIG. 2. The first and second axles 38 and 40 are accessed in the actuating assembly cavity 23 through one or more apertures suitably located. For example, the actuating assembly body 22 includes upper and lower shells that are placed on top of each other during assembly and together define the apertures leading outside thereof, so that the interior components of the actuating assembly 10 may be assembled first in one the shells, for example the lower shell, followed by securing the other shell to the first one. For example, the first and second axles 38 and 40 are concentric and enter the actuating assembly cavity 23 through an axle aperture 42 provided in the actuating assembly body 22 and leading into the actuating assembly cavity 23. When the first and second axles 38 and 40 are not concentric, two axle apertures 42 are provided, one for each of the first and second axles 38 and 40.

Figure 1:
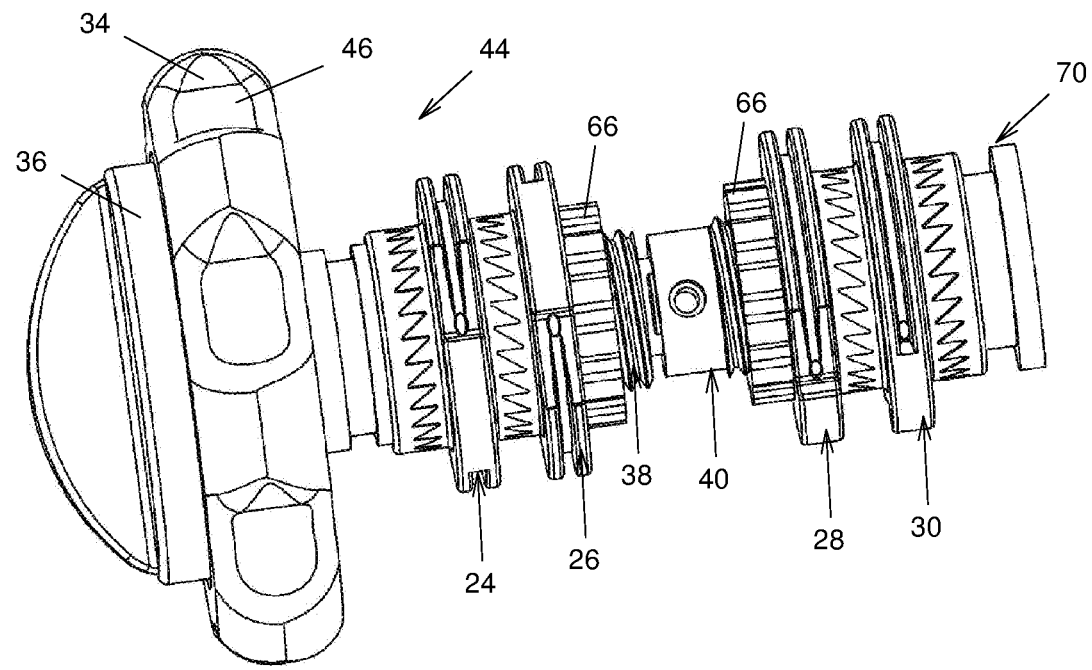
FIG. 1, in a perspective view, illustrates a steering assembly usable in an actuating assembly.

The assembly of the first and second knobs 34 and 36 and the first and second axles 38 and 40, the wheels 24, 26, 28 and 30 and of the associated components linking these elements to each other is referred herein as a steering assembly 44, seen for example in FIGS. 1 and 2. Many different steering assemblies are described in the present document, but they all have a common function of facilitating assembly of one or more steering wires 14, 16, 18 and 20 to one or more wheels 24, 26, 28 and 30 and to allow steering the catheter 12 once assembly has been completed. The various components present in the steering assembly 44 are described hereinbelow.

The first and second knobs 34 and 36 are configured to allow an intended users of the actuating assembly 10 to rotate the first and second knobs 34 and 36 relatively precisely using their fingers. It should be noted that while first and second knobs 34 and 36 are shown in the drawings, the wheels 24, 26, 28 and 30 could be actuated by suitable electric motors, instead or in addition to the first and second knobs 34 and 36.

The first and second knobs 34 and 36 are substantially coaxial with each other and substantially adjacent to each other in the actuating assembly 10. The first and second knobs 34 and 36 may have similar outer diameters, or may have different diameters, as illustrated in FIG. 1 for example. Also, the first and second knobs 34 and 36 may be of similar general configuration, or may have different configurations, also as seen in FIG. 1. For example, the first knob 34 has an outer circumference defining a plurality of recesses 46 to facilitate engagement with the fingers of the intended user, as seen for example in FIG. 3. Also for example, the second knob 36 may define a wing extending perpendicular to the circumference of the first knob 34. However, any other suitable configuration for the first and second knobs 34 and 36 is within the scope of the invention.

Figure 26:
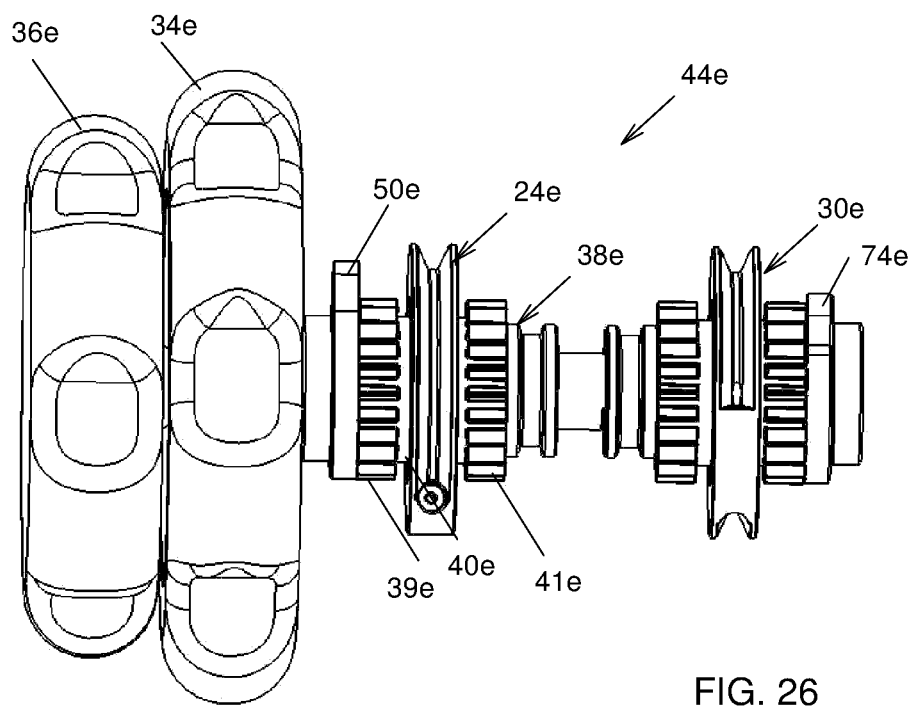
FIG. 26, in a perspective view with parts removed, illustrates a steering assembly incorporating the wheel of FIGS. 23 to 25.
Figure 28:
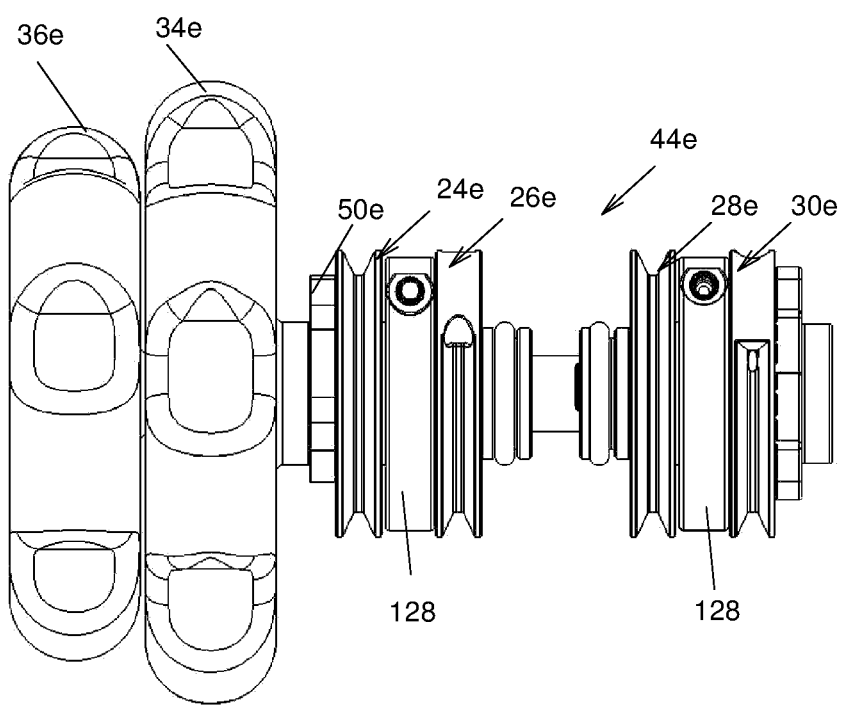
FIG. 28, in a side elevation view, illustrates the steering assembly of FIGS. 26 and 27.

At least one of the wheels 24, 26, 28 or 30 is movable between a wheel mounting configuration, wherein the wheel remains on the first or second axle 38 or 40 to which it is mounted while being rotatable about the rotation axis 32 independently of the first or second axle 38 or 40, and a wheel actuating configuration wherein the wheel 24, 26, 28 or 30 is mounted to the first or second axle 38 or 40 and jointly rotatable along therewith about the rotation axis 32. For example, FIG. 26 illustrates a wheel 24e in the mounting configuration and FIG. 28 illustrates the wheel 24e in the actuating configuration. Typically, all the wheels 24, 26, 28 and 30 may achieve both the wheel actuating and mounting configurations, but embodiments in which only some of the wheels 24, 26, 28 and 30 may achieve the mounting configuration are within the scope of the invention. In some embodiments, one wheel 24 or 26, or 28 or 30 from each pair of wheels 24 and 26, and 28 and 30 is permanently fixed to its respective first or second axle 38 or 40, as rotating the first or second axle 38 or 40 would allow mounting of a steering wire 14, 16, 18 or 20 thereto. The other wheel 24 or 26, or 28 or 30 from the pair is then movable to the mounting configurations to mount the other paired steering wire 14, 16, 18 or 20 thereto. In the wheel mounting configuration, the wheel 24e is rotatable about the first axle 38e to wind the steering wire 14 (not shown in FIGS. 26 and 28) therearound and tension the steering wire 14 to an operational tension when assembling the actuating assembly 10 and the wire steered device 12 to each other. In the wheel actuating configuration, the wheel 24e and the first axle 38e are jointly rotatable by the knob 34e, which acts as an actuator, to wind and unwind the steering wire 14 on and from the wheel 24e to steer the wire steered device 12.

Typically, the two wheels within each pair of wheels 24 and 26 or 28 and 30 are rotatable about the rotation axis independently from each other in its wheel mounting configuration. Also typically, the two wheels 24 and 26 or 28 and 30 within each pair of wheels 24 and 26 or 28 and 30 are movable to their respective wheel mounting configurations independently from each other, and in some embodiments simultaneously, in which case both wheels 24 and 26 or 28 and 30 from each pair may be in their mounting configuration at the same time, so that each wire 14, 16, 18 and 20 can be mounted to a respective wheel 24, 26, 28 or 30 without moving the wheels 24, 26, 28 and 30 along the first and second axles 38 and 40.

Figure 3:
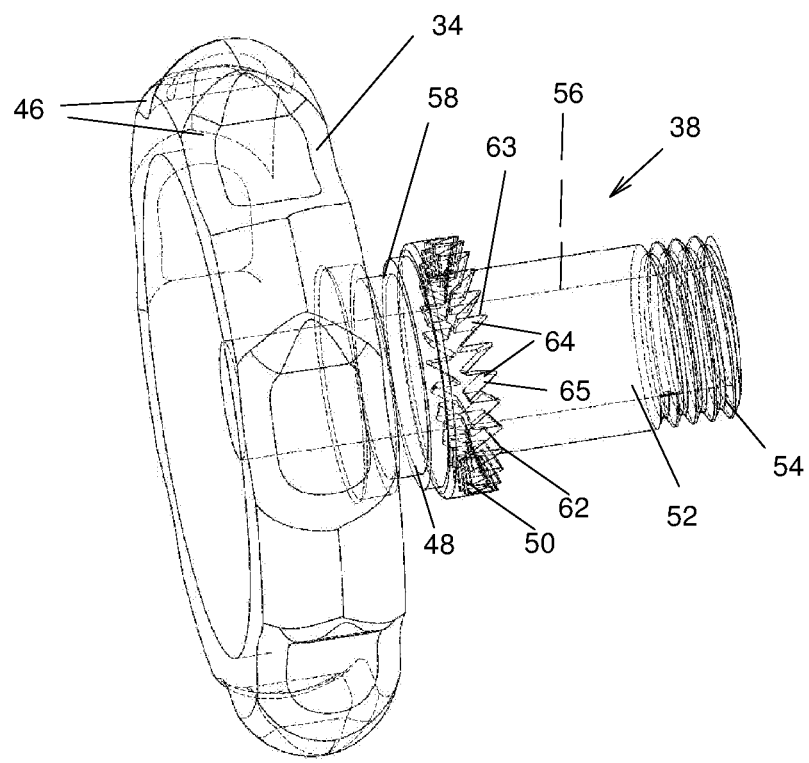
FIG. 3, in a perspective view with hidden lines shown, illustrates a first actuator and a first axle part of the steering assembly of FIG. 1.
Figure 4:
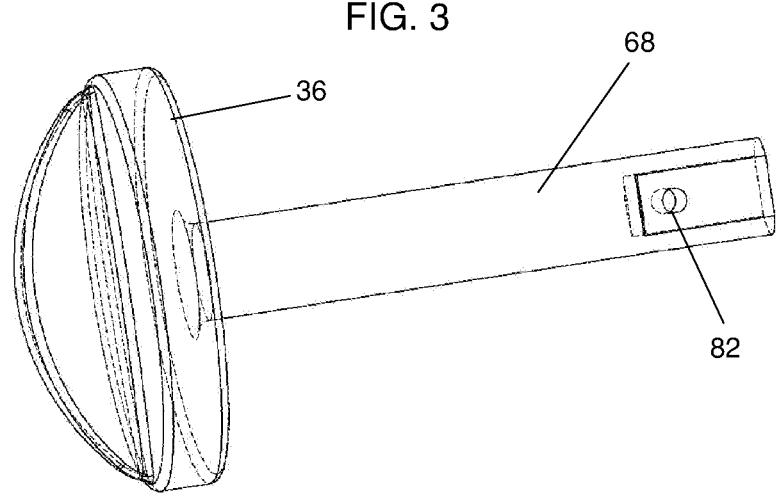
FIG. 4, in a perspective view with hidden lines shown, illustrates a second actuator and a link part of the steering assembly of FIG. 1.

Referring to FIG. 3, in a specific embodiment, the first axle 38 extends integrally from the first knob 34 and defines successive first axle mounting, locking, wheel receiving and lock ring mounting sections 48, 50, 52 and 54, in a direction leading away from the first knob 34. When the first and second knobs 34 and 36 are provided adjacent to each other, as in FIGS. 1 and 2, the first axle 38 defines a first axle passageway 56 extending axially therethrough, which receives part of the second axle 40 thereinto so that the latter is axially rotatable inside the former.

The first axle mounting section 48 is mounted to the actuating assembly body 22, in the axle aperture 42. In some embodiments, the first axle mounting section 48 defines a first axle mounting section groove 58 for receiving an O-ring 60 (seen in FIG. 2), made of a material suitable for increasing frictional forces between the actuating assembly body 22 and the first axle 38. For example, the O-ring 60 is a resiliently deformable ring extending between the first axle 38 and the actuating assembly body 22 which frictionally engages the first axle 38 and the actuating assembly body 22. In some embodiments, the O-ring 60 is slightly compressed between the first axle 38 and the actuating assembly body 22 to provide frictional resistance to rotation of the first axle 38 relative to the actuating assembly body 22 while allowing rotation of the first axle 38 relative to the actuating assembly body 22 when a predetermined minimal torque is exerted by the first knob 34 on the first axle 38. However, the O-ring 60 and the first axle mounting section groove 58 may be omitted in some embodiments, or replaced by other structures having a similar function.

The first axle locking section 50 extends from the first axle mounting section 48 and is configured for engaging one of the wheels, here the first wheel 24, so that the first axle 38 and the first wheel 24, are jointly rotatable. For example, the first axle locking section 50 takes the form of a flange that protrudes radially from adjacent portions of the first axle 38 and defines a first axle toothed face 62 including a plurality of axle teeth 64 facing axially towards the first axle wheel receiving section 52. In some embodiments, the axle teeth 64 have a perpendicular face 63 that extends generally radially relative to the rotation axis 32, and a slanted face 65 that is at an angle relative to the perpendicular face 63. The perpendicular faces 63 are oriented such that force transmission between the first axle 38 and the first wheel 24 when the first axle 38 is rotated by the actuator occurs through the perpendicular faces 63 of when the first axle 38 is rotated in a direction leading to winding of the first steering wire 14 around the first wheel 24.

The first axle wheel receiving section 52 extends from the first axle locking section 50 and has a diameter that is smaller than the first axle toothed face 62. The first axle wheel receiving section 52 is configured for receiving the first and second wheels 24 and 26 thereonto so that the first and second wheels 24 and 26 are slidable and rotatable relative thereto.

The first axle lock ring mounting section 54 extends from the first axle wheel receiving section 52 and is threaded so that a lock ring 66, seen for example in FIGS. 1 and 2, may be screwed thereonto. The lock ring 66 may be provided with a textured circumferential outer surface to facilitate tightening and loosening of the lock ring 66 relative to the first axle 38. The lock ring 66 acts as a lock for selectively locking the first and second wheels 24 and 26 in the first and second wheel actuating configuration.

Figure 5:
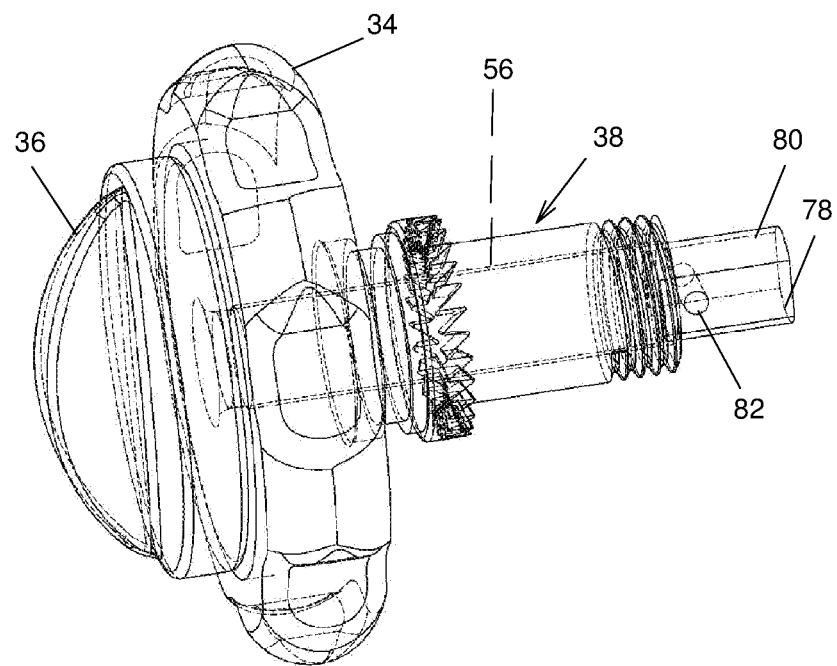
FIG. 5, in a perspective view with hidden lines shown, illustrates the second actuator and link of FIG. 4 mounted to the first actuator and first axle of FIG. 3.
Figure 6:
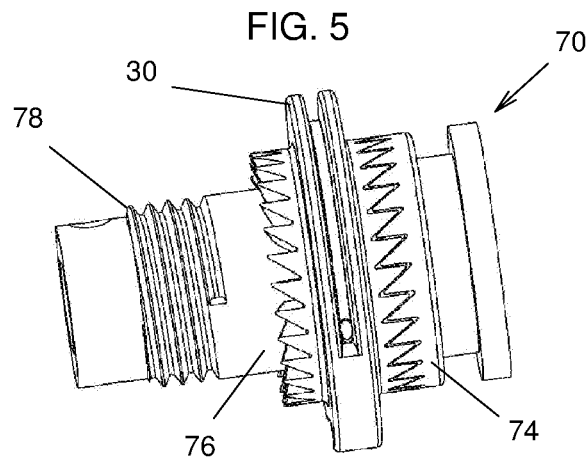
FIG. 6, in a perspective view with hidden lines shown, illustrates a second axle effective portion part of the steering assembly of FIG. 1.
Figures 7, 8:
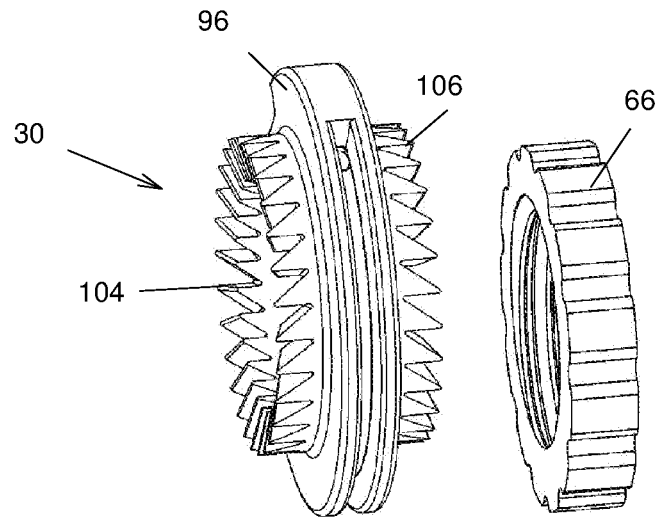
FIG. 7, in a perspective view, illustrates a wheel of a first type mountable to the first and second axles of FIGS. 3 and 6 respectively.
FIG. 8, in a perspective view, illustrates a lock ring mountable to the first and second axles of FIGS. 3 and 6 respectively.
Figure 12:
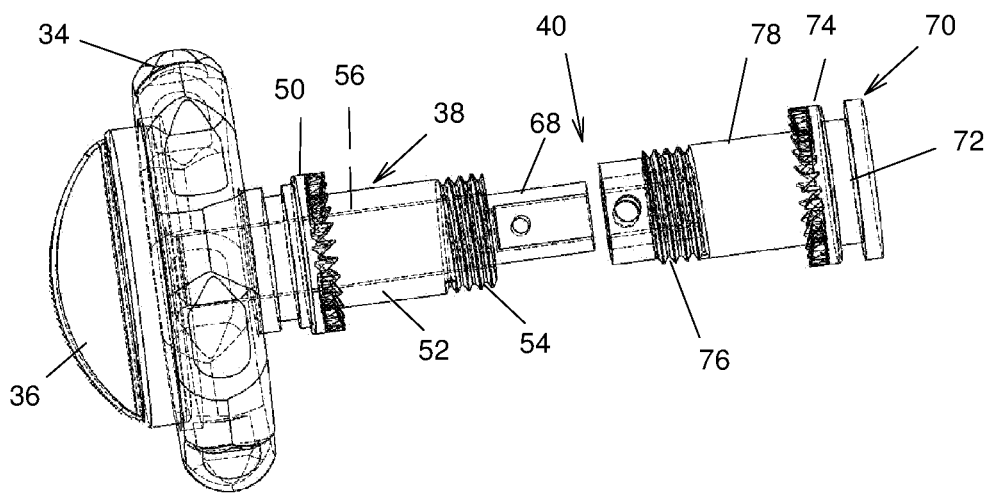
FIG. 12, in a side elevation view with some hidden lines shown, illustrates the assembly of FIG. 5 adjacent the second axle of FIG. 9.
Figure 13:
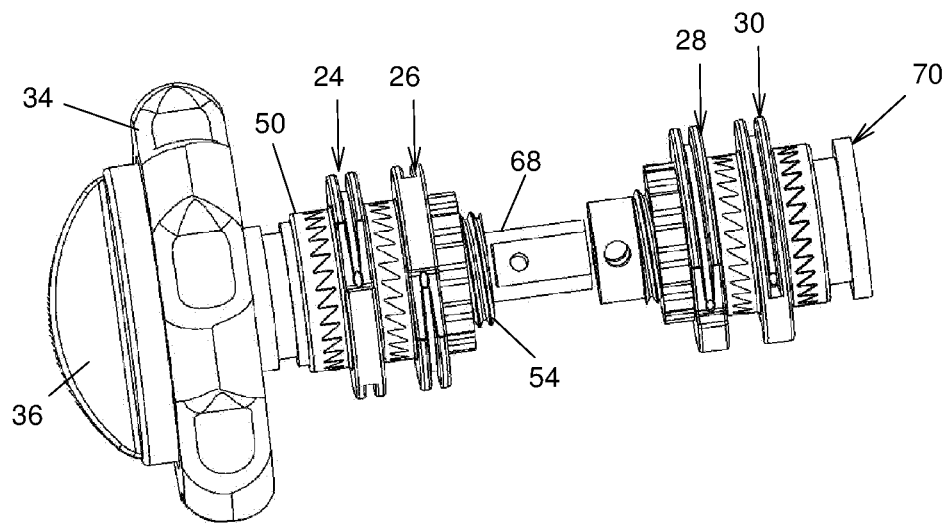
FIG. 13, in a partially exploded side elevation view, illustrates the steering assembly of FIG. 1 with the second axle and link thereof detached and spaced apart from each other.

Referring for example to FIG. 12, the second axle 40 defines a second axle link 68 extending from the second knob 36, for example integrally therewith, and a second axle effective portion 70 removably attachable to the second axle link 68. The second axle link 68 is inserted in the first axle passageway 56 and typically relatively snugly received thereinto while remaining rotatable relative thereto. Referring to FIG. 5, the second axle link 68 is terminated opposed to the second knob by a second axle link coupling portion 80 through which a laterally extending second axle link aperture 82 extends. The second axle link coupling portion 80 may have a portion of the circumference thereof that is flat or otherwise shaped to better transmit axial torques. In some embodiments, the second axle link 68 may be selectively attached or detached from the second axle effective portion 70.

Figure 9:
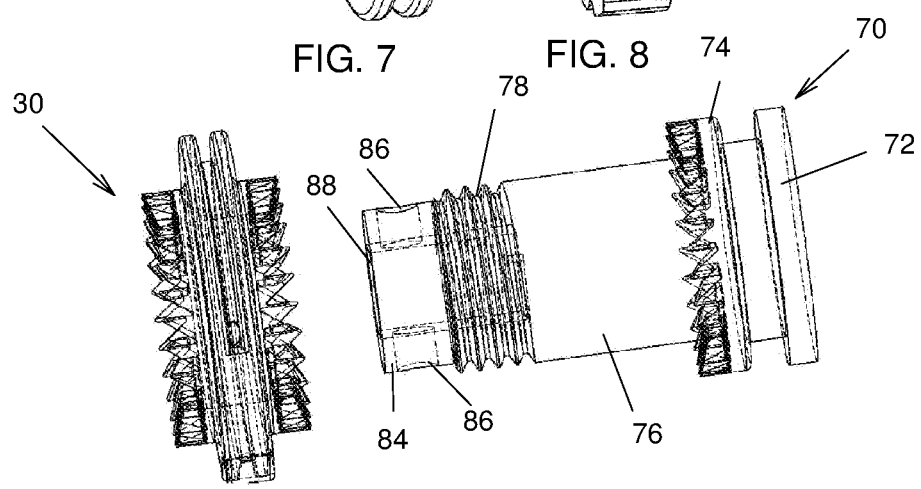
FIG. 9, in a perspective view with hidden lines shown, illustrates the second axle of FIG. 6 and the wheel of FIG. 7 adjacent to each other prior to mounting.
Figures 10, 11:
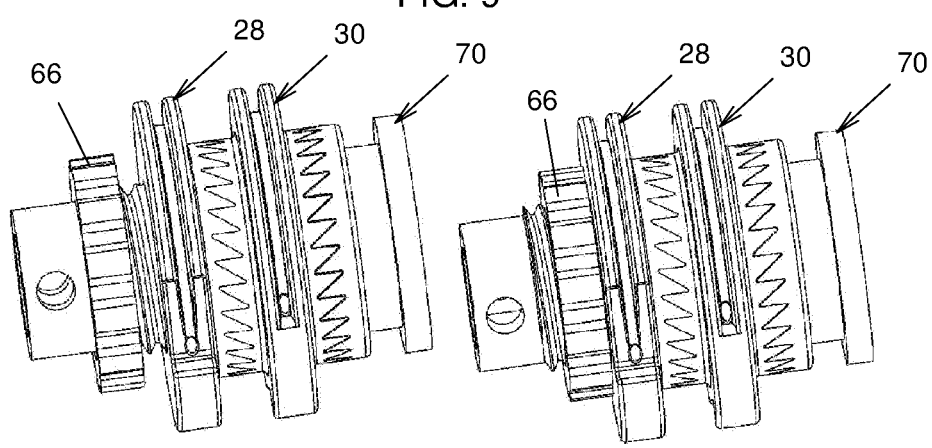
FIG. 10, in a perspective view, illustrates the second axle of FIG. 6 with a wheel of a second type and the wheel of the first type mounted thereto the second axle, the lock ring of FIG. 8 being also mounted to the second axle and shown here in an unlocking position.
FIG. 11, in a perspective view, illustrates the second axle, wheels of the first and second types and lock ring as in FIG. 10, but with the lock ring shown in a locking position.

Referring to FIG. 9, the second axle effective portion 70 defines successive second axle mounting, locking, wheel receiving and lock ring mounting sections 72, 74, 76 and 78, and a second axle effective portion link 84, in a direction leading towards the second knob 36. The second axle effective portion link 84 is configured for engaging the second axle link coupling portion 80 so that the second axle link and effective portions 68 and 70 are jointly rotatable axially. For example, a suitably sized effective portion recess 88 is defined, shaped complementarily to the second axle link coupling portion 80, and a pair of diametrically opposed effective portion apertures 86 are provided, so that the effective portion apertures 86 and the second axle link aperture 82 are in register to each other and a set screw (not shown in FIG. 9) is inserted therethrough to lock the second axle link and effective portions 68 and 70 to each other. When the set screw is removed, the steering assembly 44 may be disassembled. Other configurations of the second axle 40, varying in the location and number of the various parts thereof that form the second axle are also within the scope of the invention, as are one-piece second axles 40.

The second axle mounting, locking, wheel receiving and lock ring mounting sections 72, 74, 76 and 78 are similar to the first axle mounting, locking, wheel receiving and lock ring mounting sections 48, 50, 52 and 54 and are therefore not further described. Typically, the second axle mounting, locking, wheel receiving and lock ring mounting sections 72, 74, 76 and 78 are a mirror image along the rotation axis 32 of the first axle mounting, locking, wheel receiving and lock ring mounting sections 48, 50, 52 and 54. The second axle mounting, locking, wheel receiving and lock ring mounting sections 72, 74, 76 and 78 are used to mount the third and fourth wheels 28 and 30, another O-ring 60 and another lock ring 66 thereonto. The second axle mounting section 72 is not mounted in an aperture, but in a suitably shaped portion of the actuating assembly body 22 allowing rotation of the second axle mounting section 72 relative thereto, for example shaped similarly to the aperture that would have its external opening closed by a wall.

Figure 16:
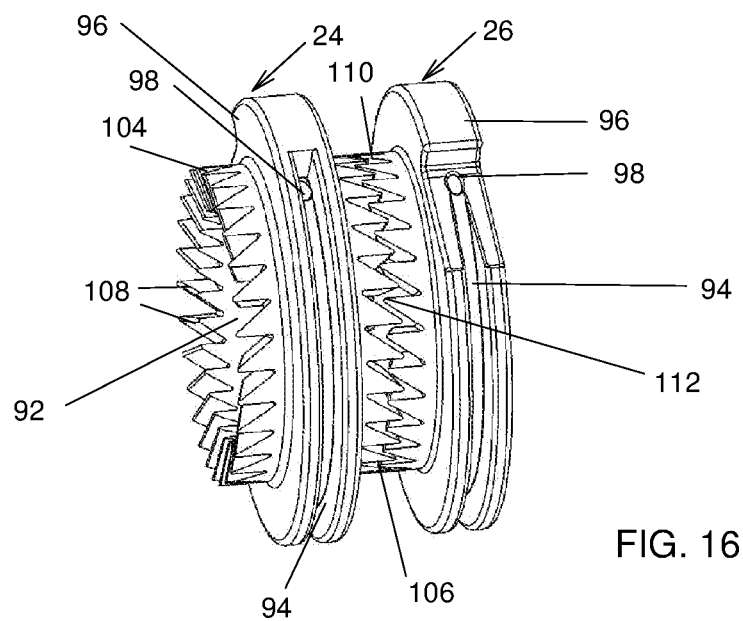
FIG. 16, in a perspective view, illustrates side by side the wheels of the first and second types of the steering assembly of FIG. 1.
Figure 24:
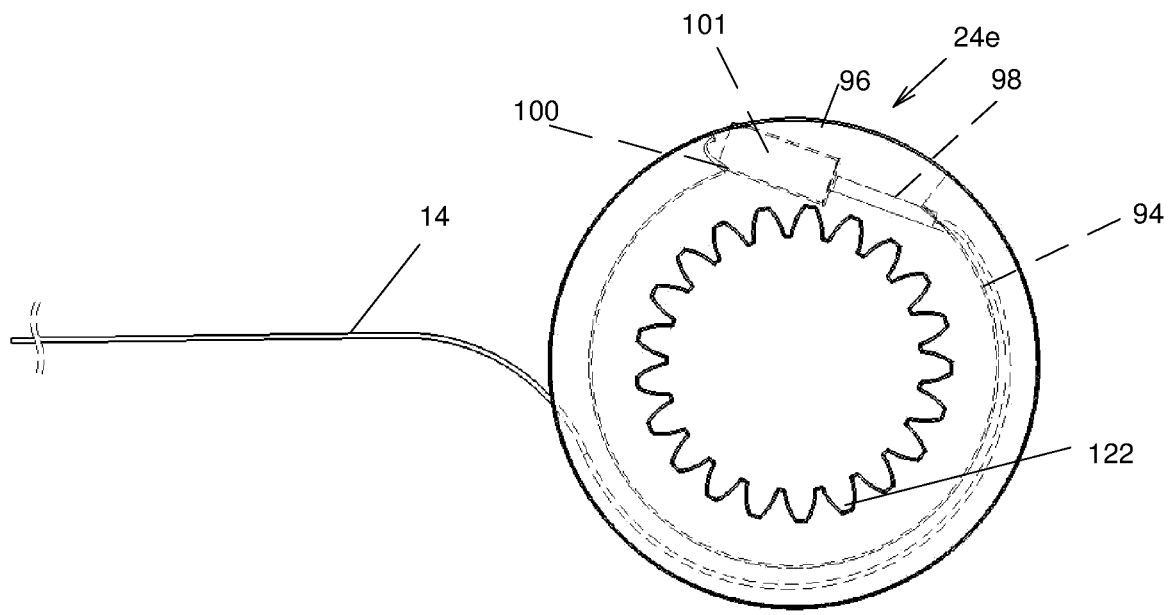
FIG. 24, in a side elevation view, illustrates attachment of a steering wire to the wheel of FIG. 23.

FIG. 16 illustrates the first and second wheels 24 and 26, the third and fourth wheels 28 and 30 being similar respectively to the second and first wheels 26 and 24, and therefore not further described herein. The first and second wheels 24 and 26 each define a central passageway 92 having a substantially cylindrical configuration of a diameter substantially similar to the diameter of the first axle wheel receiving section 52. A circumferential groove 94 is formed on the circumference of each of the first and second wheels 24 and 26. The circumferential grooves 94 extend along at least part of first and second wheels 24 and 26 along are interrupted by a mounting block 96 through which a wire mounting aperture 98 extends, so that the wire mounting aperture 98 for example extends between opposed ends of the circumferential groove 94. The mounting block and mounting aperture are part of an attachment for attaching the steering wires 14 and 16 thereto. As seen in FIG. 24, the wire mounting aperture 98 may be provided at one end thereof with an enlarged portion 100 configured for receiving a ferrule 102 or other similar structure mounted, for example crimped, at the end of the steering wires 14, 16, 18 and 20. The ferrule 102 is also part of the wire attachment and is larger than the wire mounting aperture 98 at its minimal diameter, so that the ferrule 102 cannot be pulled therethrough. The wire mounting aperture 98 is provided in periphery of the first and second wheels 24 and 26 and, typically, the circumferential groove 94 extends in prolongation of the wire mounting aperture 98. In other words, in such embodiments, a steering wire 14 or 16 received through a mounting aperture 98 is directly received in the circumferential groove 94, continuously from the wire mounting aperture 98 without losing contact with the wheel 24 or 26.

Returning to FIG. 16, the first wheel 24 is provided with opposed first wheel first and second toothed faces 104 and 106 including respectively a plurality of axle engaging teeth 108 and wheel coupling teeth 110 facing perpendicular to the rotation axis 32, towards and away from the first axle toothed face 62. The first wheel first and second toothed faces 104 and 106 are similar to the first axle toothed face 62, with configurations such the that first wheel first toothed face 104 faces and meshes with the first axle toothed face 62 so that the first axle toothed face 62 and first wheel first toothed face 104 are jointly rotatable axially, and the first axle toothed face 62 and first wheel second toothed face 106 are substantially similar to each other. The second wheel 26 is only provided with one second wheel toothed face 112, similar to the first wheel first toothed face 104 and facing axially towards the first wheel second toothed face 106. The surface of the second wheel 26 opposed to the second wheel toothed face 112 is typically substantially flat so as to allow the lock ring 66 to abut thereagainst while being rotatable about the rotation axis 32. The second wheel toothed face 112 and the first wheel second toothed face 106 engage each other when the first and second wheels 24 and 26 are in the in the first and second wheel actuating configurations so that the first and second wheels 24 and 26 are jointly rotatable about the rotation axis The steering assembly 44 is configurable between a mounting configuration and an actuating configuration. In both configurations, the whole actuating assembly is assembled, but the lock rings 66 are in different positions. More specifically, in the actuating configuration, the lock rings 66 are fully screwed on the first and second axle lock ring mounting sections 54 and 78. In this configuration, the first wheel first toothed face 104 engages the first axle toothed face 62 so that these first axle 38 and the first wheel 24 are jointly axially rotatable. Also, the first wheel second toothed face 106 engages the second wheel toothed face 112 so that the first and second wheels 24 and 26 are jointly axially rotatable. Finally, the lock ring 66 abuts against the second wheel 26, opposed to the second wheel toothed face 112. The lock ring 66 is typically firmly screwed on the first axle lock ring mounting section 54. A similar relationship exists between the second axle effective portion 70, the third and fourth wheels 28 and 30, and the other lock ring 66. The axle engaging teeth 108 and the wheel coupling teeth 110 each have a face extending radially relative to the rotation axis 32 and another face angled relative thereto, similarly to the axle teeth 64.

Figure 29:
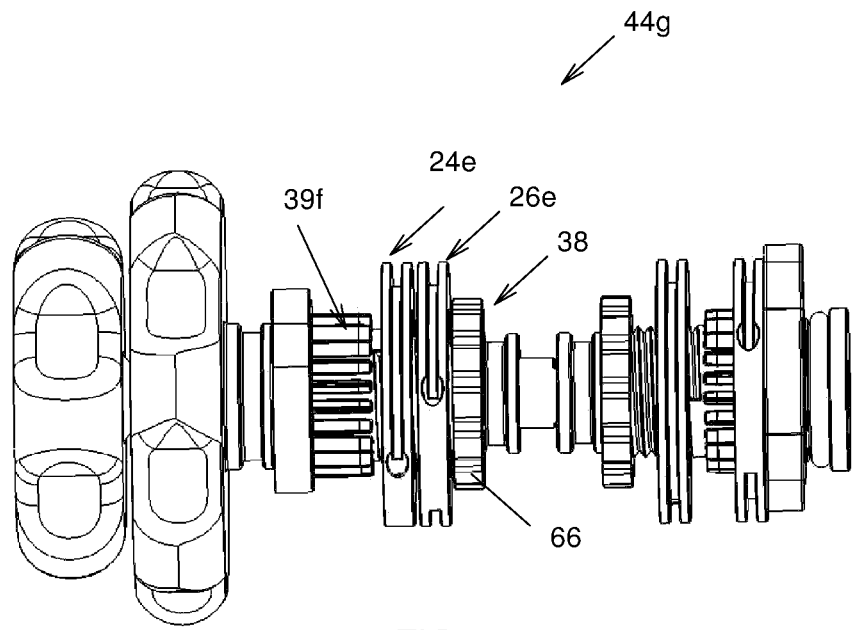
FIG. 29, in a side elevation view, illustrates yet another steering assembly incorporating the wheel of FIGS. 23 to 25, the wheels being shown in a mounting configuration.

The axle teeth 64 and the axle engaging teeth 108 engage each other in the first wheel actuating configuration to force joint rotation about the rotation axis 32 of the first axle 38 and first wheel 24. The axle teeth 64 and axle engaging teeth 108 are disengaged from each other in the first wheel mounting configuration to allow rotation about the rotation axis 32 of the first wheel 24 independently from the first axle 38. This is achieved by moving axially the first wheel 24 along the first axle 38 when passing between the first wheel mounting and actuating configurations. It should be noted that in alternative embodiments, changes from the first wheel actuating and moving configurations could be caused by other types of configuration changes. For example, a lock pin or other structure could selectively lock the first wheel 24 and the first axle 38 to each other selectively, so that when the lock pin is removed, the first wheel mounting configuration is achieved. Other manners of selectively coupling rotation of the first axle 38 and first wheel 24 to each other are also within the scope of the invention. The first and second wheels 24 and 26 are restricted in the first and second wheel actuating configurations when the lock ring 66 is screwed to a locking position on the first axle 38, as seen for example in FIG. 1. The first and second wheels 24 and 26 are allowed to move to the first and second wheel mounting configurations when the lock ring 66 is unscrewed and moved to an unlocking position on the first axle 38, as seen in FIG. 29 for an alternative actuating assembly 44g.

More specifically, in the mounting configuration, the lock rings 66 are loosened on the first and second axle lock ring mounting sections 54 and 78 so that the lock rings 66 are spaced apart from the first and second axle locking sections 50 and 74 by a larger distance than in the actuating configuration. This distance is large enough to allow spacing apart the first wheel 24 from the first axle locking section 50 and/or the second wheel 26 from the first wheel 24 so that free rotation of at least one of the first and second wheels 24 and 26 relative to the first axle 38 is possible. A similar configuration is achievable for the third and fourth wheel to allow free rotation of at least one of the third and fourth wheels 28 and 30 relative to the second axle 40. Typically, this distance is large enough that the first and second wheels 24 and 26 may be moved axially to be disengaged from each other and the first wheel 24 is may be moved axially to be disengaged from the first axle locking section 50. Also, typically, this distance is large enough that the third and fourth wheels 28 and 30 may be moved axially to be disengaged from each other and the third wheel 30 may be moved axially to be disengaged from the second axle locking section 74. This allows free rotation of all the wheels 24, 26, 28 and 30 about the rotation axis 32, independently from the first and second axles 38 and 40 and independently from each other.

In some embodiments, the lock rings 66 are secured in the actuating configuration simply through frictional forces between the components of the steering assembly 44 and resilient deformation of these components caused by the screwing process. However, in alternative embodiments, an insert is mounted to the first and second axles 38 and 40 between the lock rings 66 in the actuating configuration. This insert is for example a component that clips to the first and second axles 38 and 40 and that has an axial dimension substantially similar to the distance between the lock rings 66 in the actuating configuration. In other embodiments, the actuating assembly body 22 defines suitably located and shaped flanges that prevent unscrewing of the lock rings 66 when the steering assembly 44 is mounted inside the actuating assembly body 22.

Many variants of the various components included in the steering assembly 44 are described hereinbelow. These variants can be combined when suitably compatible. Only the differences between these variants and the above-described components are detailed hereinbelow.

Figure 17:
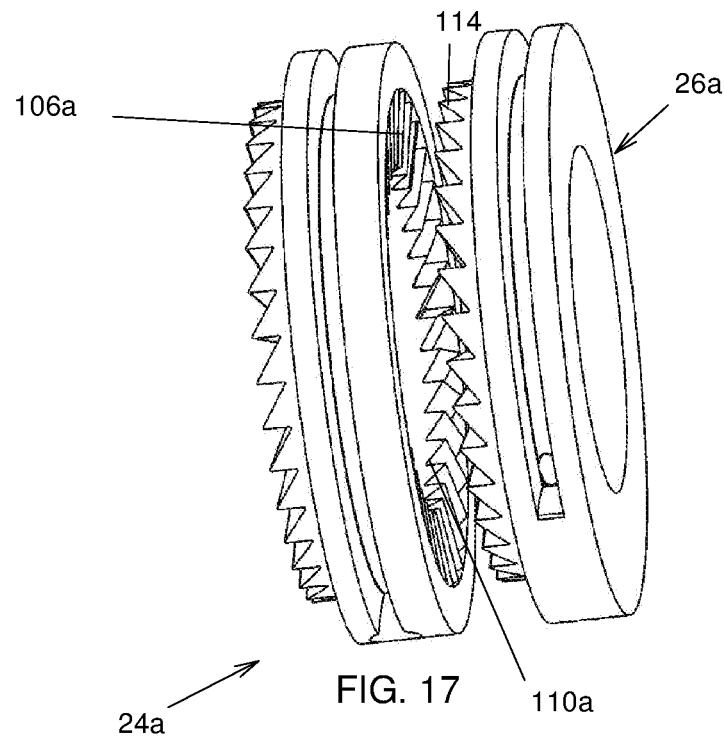
FIG. 17, in a perspective view, illustrates side by side the an alternative wheel of the first type and the wheel of the second type of FIG. 16 usable in the actuating assembly of FIG. 1.
Figure 18:
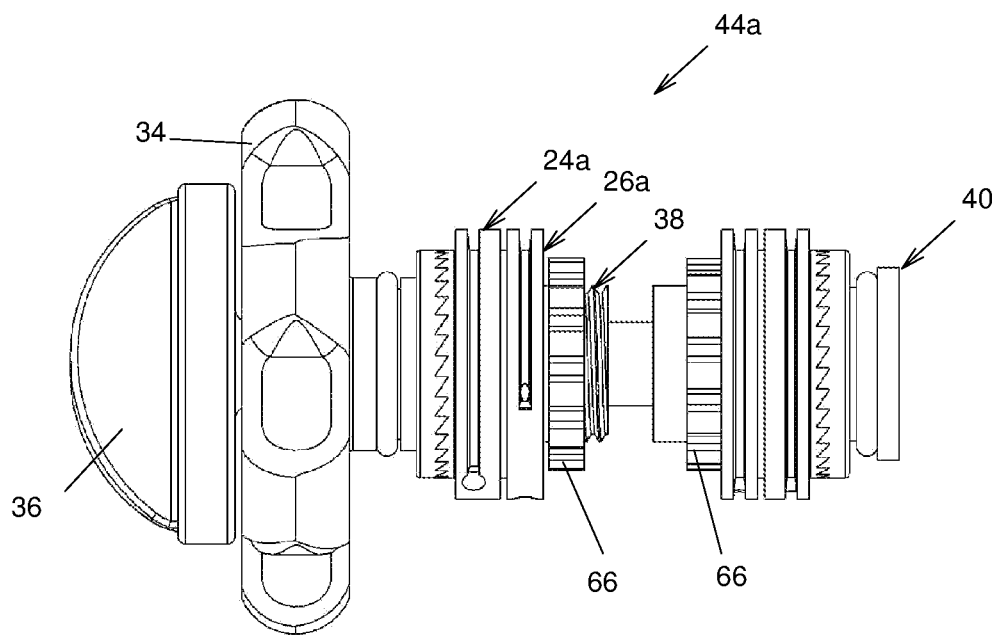
FIG. 18, in a perspective view, illustrates an alternative steering assembly including the wheels of FIG. 17.

FIG. 17 illustrates an alternative first wheel 24a including a recessed first wheel second toothed face 106a, defining suitably shaped recessed female teeth 110*a* that receive the teeth 114 of the second wheel toothed face 112, instead of having the first wheel second toothed face 106 with protruding wheel coupling teeth 110. The third wheel 28 may similarly be of a similar configuration. This configuration may allow for a more compact steering assembly 44*a*, seen in FIG. 18, when compared to the use of the first wheel 24.

Figures 19, 20:
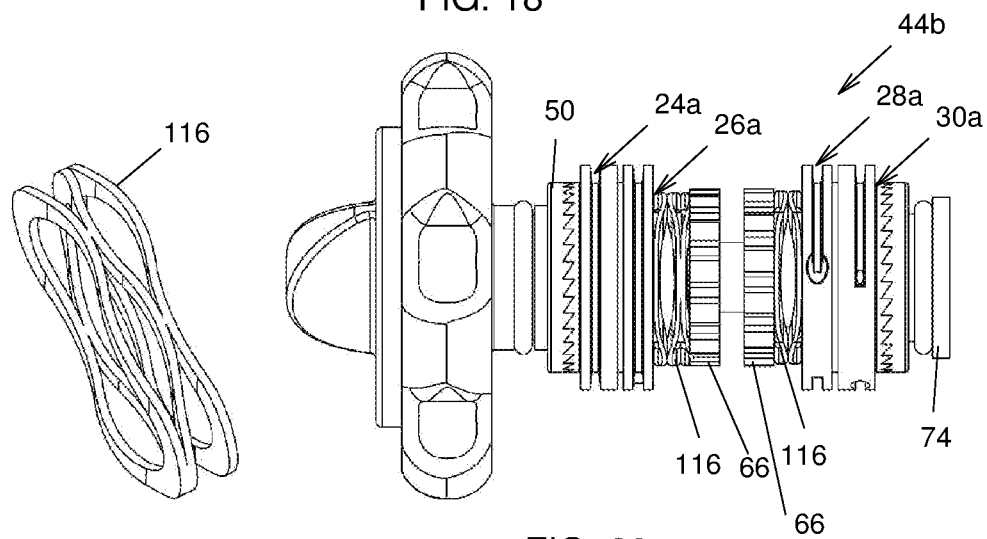
FIG. 19, in a perspective view, illustrates a biasing element usable in another alternative steering assembly.
FIG. 20, in a side elevation view, illustrates an other alternative steering assembly including the biasing element of FIG. 19.

FIG. 19 illustrates a biasing element 116, in the form of a wave spring, insertable between the second wheel 26*a* and the lock ring 66 and between the third wheel 28*a* and the lock ring 66 to form an alternative steering assembly 44*b*, see for example in FIG. 20. In this configuration, the biasing elements 116 bias the second wheel 26*a* towards the first wheel 24*a*, which is then in turn biased towards the first axle locking section 50, and the third wheel 28*a* towards the fourth wheel 30*a*, which is then in turn biased towards the second axle locking section 74. The biasing element 116 allows to fully assembly of the actuating element 44*b* and then tighten the steering wires 14, 16, 18 and 20.

The axle teeth 64 of the first axle toothed face 62 and the axle engaging teeth 108 of the first wheel first toothed face 104 are shaped to allow them to climb along each other in a direction allowing to pull on the first steering wire 14 against the biasing force of the biasing element 116. This is achieved by suitably sloping one face of the axle and axle engaging teeth 64 and 108 relative to the rotation axis 32. That is, the axle and axle engaging teeth 64 and 108 each have a respective face that is in a plane that is angled relative to radii of the rotation axis 32. The other face of the axle and axle engaging teeth 64 and 108 is typically in a plane radial relative to the rotation axis 32. In this configuration, transmission of torques between the components of the steering assembly 44*b* is optimized when one wants to pull on the first steering wire 14 in operation. To tighten the first steering wire 14 about the first wheel 24, one simply inserts the first steering wire 14 through the wire mounting aperture 98, installs a ferrule 102, or any other wire termination, at the proximal end of the first steering wire 14 and rotates the first wheel 24*a* in a suitable direction (for example counterclockwise when viewed from the first knob 34 side) until the ferrule abuts against the mounting block and the first steering wire 14 and is suitably taut. The first wheel 24*a* will then ratchet relative to the first axle locking section 50, compressing the biasing element 116 each time the teeth of the first wheel 24*a* and the first axle locking section 50 climb each other.

The second wheel 26*a* is configured to be rotatable in the direction opposite the first wheel 24*a* and against the biasing force of the biasing element 116 due to the manner in which the first and second wheels 24*a* and 26*a* engage each other so that the second steering wire 16 may be mounted thereto, wound in direction opposite the direction in which the first steering wire 14 is mounted. Similarly, the third and fourth wheels 28*a* and 30*a* are also configured similarly to the first and second wheels 24*a* and 26*a* to allow mounting of the third and fourth steering wires 18 and 20 thereto.

Figure 21:
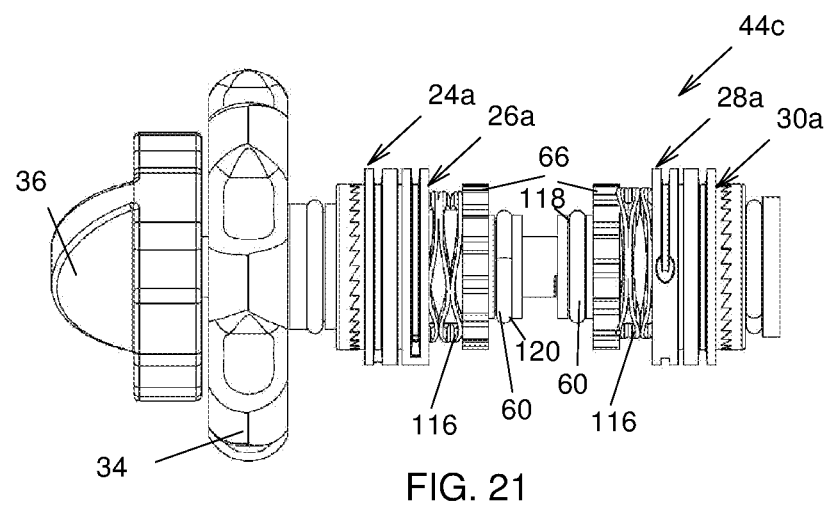
FIG. 21, in a side elevation view, illustrates yet another alternative steering assembly.
Figure 22:
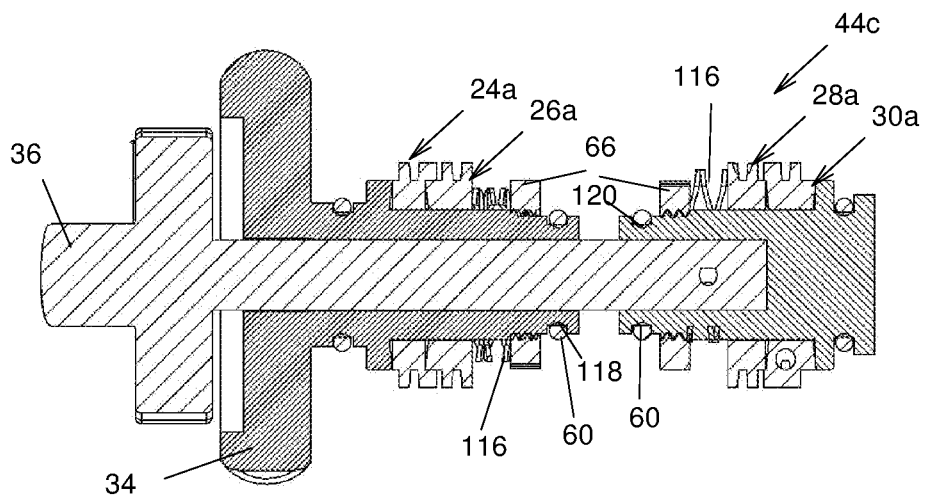
FIG. 22, in a side cross-section view, illustrates the steering assembly of FIG. 21.

In some embodiments, as seen in the steering assembly 44*c* of FIGS. 21 and 22, the first and second axles 38 and 40 are also provided with O-rings 60 in suitably shaped grooves 118 and 120 provided at locations between the two lock rings 66. The O-rings 60 are configured to engage suitably shaped portions of the periphery of the actuating assembly cavity 23 to stabilize the first and second axles 38 and 40 and to increase friction to prevent undesired movements of the first and second axles 38 and 40.

Figure 23:
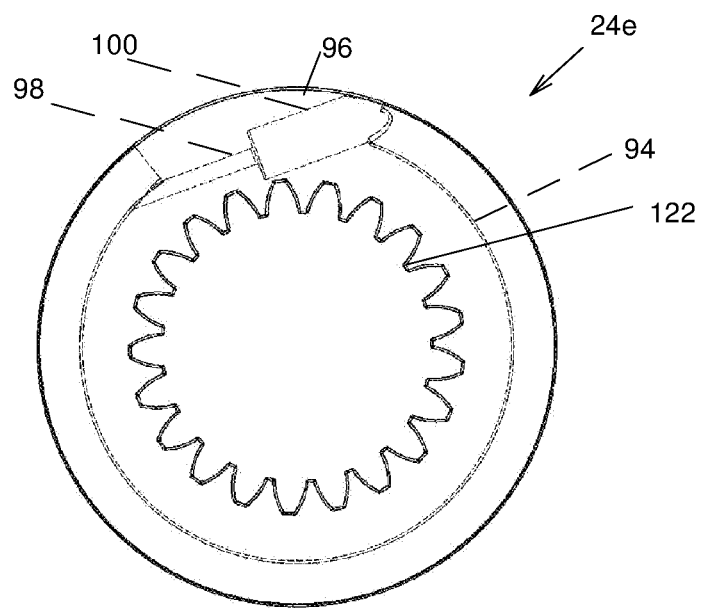
FIG. 23, in a side elevation view, illustrates an alternative wheel usable in yet another alternative steering assemblies.
Figure 25:
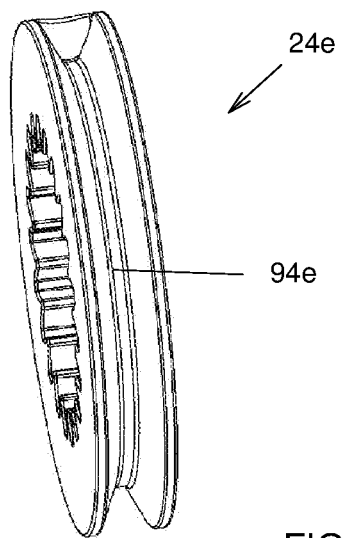
FIG. 25, in a perspective view, illustrates the wheel of FIG. 23.

In yet other alternative embodiments, the wheels 24, 26, 28 and 30 don't have a toothed design as described hereinabove, but instead each define an internal gear 122 formed by teeth that face radially inwardly, as seen in FIG. 23. In these embodiments, all the wheels 24*e*, 26*e*, 28*e* and 30*e* have a similar configuration, and only the first wheel 24*e* is shown in FIG. 23. A seen in FIG. 25, the wheel 24*e* has a V-shaped groove 94*e*. In some embodiments, it may be easier to manufacture the actuating assembly 10 with the wheels 24*e*, 26*e*, 28*e* and 30*e* such that the wheels 24*e*, 26*e*, 28*e* and 30*e* don't unintentionally slip relative to the first and second axles 38 and 40, when compared to the previously described wheels, especially, but non-limitingly, if the actuating assembly 10 is relatively small and/or when the wire tension force required is high.

Figure 27:
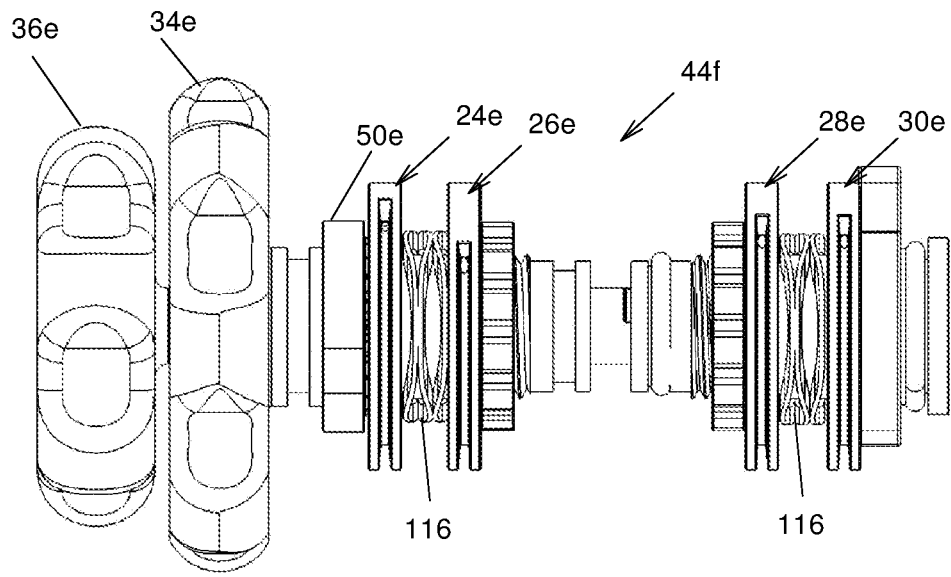
FIG. 27, in a side elevation view with parts removed, illustrates the steering assembly of FIG. 26.

FIG. 26 illustrates some elements of a steering assembly 44*e* with only two wheels 24*e* and 30*e* shown mounted thereto. In the steering assembly 44*e*, the first and second axle locking sections 50 and 74 are replaced by two flanges 50*e* and 74*e* against which the first and fourth wheels 24*e* and 30*e* can abut. The first axle 38*e* defines a pair of outward gears 39*e* and 41*e* defining each radially outwardly facing teeth configured each to engage the internal gear 122 of the first and second wheels 24*e* and 26*e* so that the first axle 38 and the first and second wheels 24*e* and 26*e* are jointly rotatable. The radially outwardly facing teeth therefore define a variation in the radius of the first axle 38 in the outward gears 39*e* and 41*e* as a function of the circumferential position along the first axle 38 that matches variations in radius of the central aperture of the wheel 24*e*. The outward gears 39*e* and 41*e* extend axially only along part of the first axle 38 and an intermediate section 52*e* is provided between the outward gears 39*e* and 41*e* and configured so that any wheel 24*e* or 26*e* in register therewith is freely rotatable relative to the first axle 38*e*. Therefore, the flange 38*e*, outward gears 39*e* and 41*e* and intermediate section 52*e* replace the first axle locking and wheel receiving sections 50 and 52. To lock the first and second wheels 24*e* and 26*e* in place over the outward gears 39*e* and 41*e* once the steering wires 14 and 16 have been mounted thereto, a rigid spacer 128 may be mounted therebetween, as seen in FIG. 28, acting as a lock. Movements of the second wheel 26*e* away from the spacer 128 may be limited by a suitable flange preventing this movement and formed by the actuating assembly body 22. In other embodiments, the spacer 128 is replaced by a biasing element 116, as seen in the steering assembly 44*f* of FIG. 27. The third and fourth wheels 28 and 30 are mounted to the second axle 40*e* in a similar manner and this part of the steering assembly 44*e* is therefore not further described.

To mount a steering wire 14, 16, 18 or 20 to one of the wheels 24*e*, 26*e*, 28*e* and 30*e*, the selected wheel 24*e*, 26*e*, 28*e* and 30*e* is moved in register with the intermediate section 40*e*, suitably rotated, and then moved back in register with one of the outward gears 39*e* and 41*e*. The steering assembly 44*e* also differs from the steering assembly 44 in that the second knob 36*e* is shaped similarly to the first knob 34, but with a slightly smaller diameter. A seen in FIG. 27, in come embodiments, a biasing element 116 is usable instead of the spacer 128.

Figure 30:
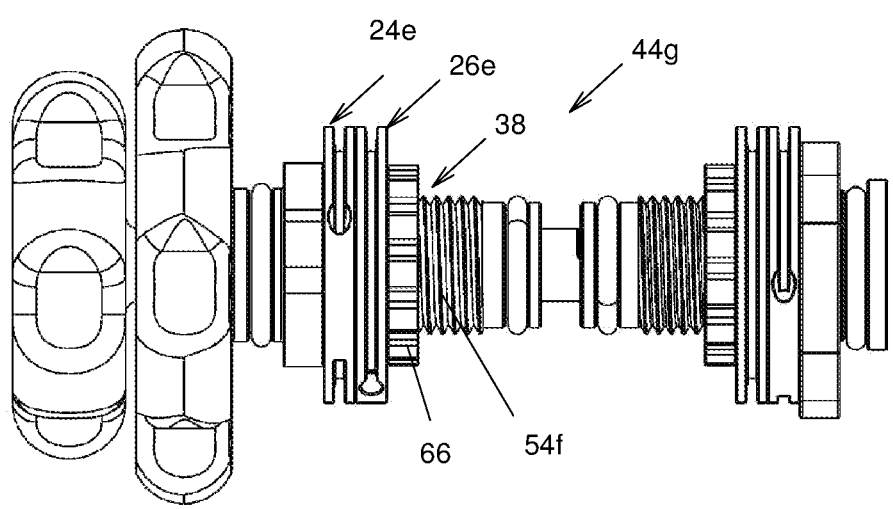
FIG. 30, in a side elevation view, illustrates the steering assembly of FIG. 29, the wheels being shown in an actuating configuration.
Figure 31:
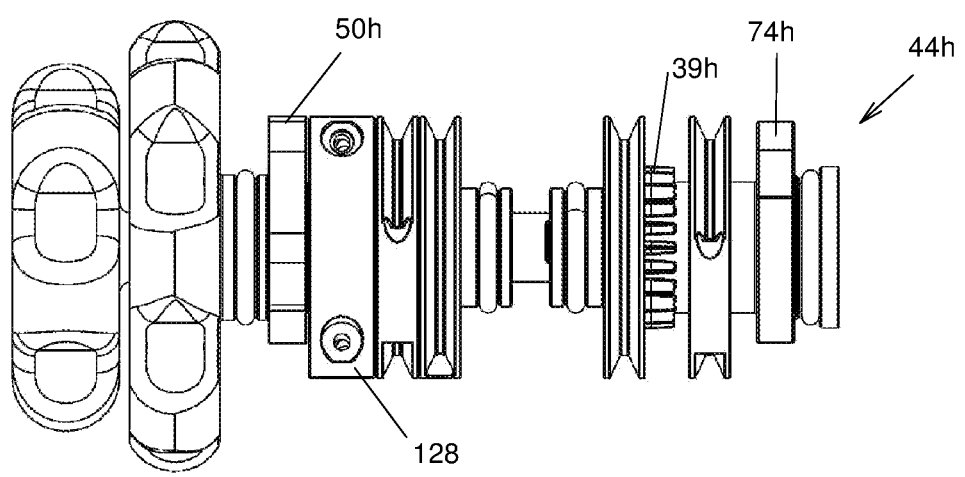
FIG. 31, in a side elevation view, illustrates yet another steering assembly incorporating the wheel of FIGS. 23 to 25.

In yet other embodiments, an steering assembly 44*g*, seen in FIGS. 29 and 30, similar to the steering assembly 44*e* is provided, with the exception that the outer gear 39*f* is wide enough to receive two wheels 24*e* and 26*e* so that the other outer gear 41*e* may be omitted. The lock ring 66 may be provided on a threaded lock ring mounting section 54*f* so that when the lock ring 66 is fully screwed, the two wheels 24*e* and 26*e* are maintained on the outer gear 39*f*. In yet other steering assemblies 44*h*, similar to the steering assembly 44g, with reference to FIG. 31, the outer gear 39h is provided away from the flanges 50h and 74h so that locking of the first and second wheels 24e and 26e on the outer gear 39h is performed by inserting a spacer 128 between the flange 50h and the first wheel 24e when the first and second wheels 24e and 26e are on the outer gear 39h. In all the embodiments described in this paragraph, the two other wheels 28e and 30e mounted to the second axle similarly to the manner in which the first and second wheels 24e and 26e are mounted to the first axle, typically in a mirror image thereof.

For exemplary purpose, attachment of one of the steering wires, steering wire 14, to the first wheel 24e is described with respect to steering assembly 44e, shown in an actuating assembly body 22e. Attachment of the other steering wires 16, 18 and 20 proceeds similarly, and attachment in the other steering assemblies 44 to 44d and 44f to 44m proceeds similarly, with obvious variations dues to the wheel-to-axle locking variations and wheel locking mechanisms variations. In this example, some of the steering wires are omitted.

Figure 32:
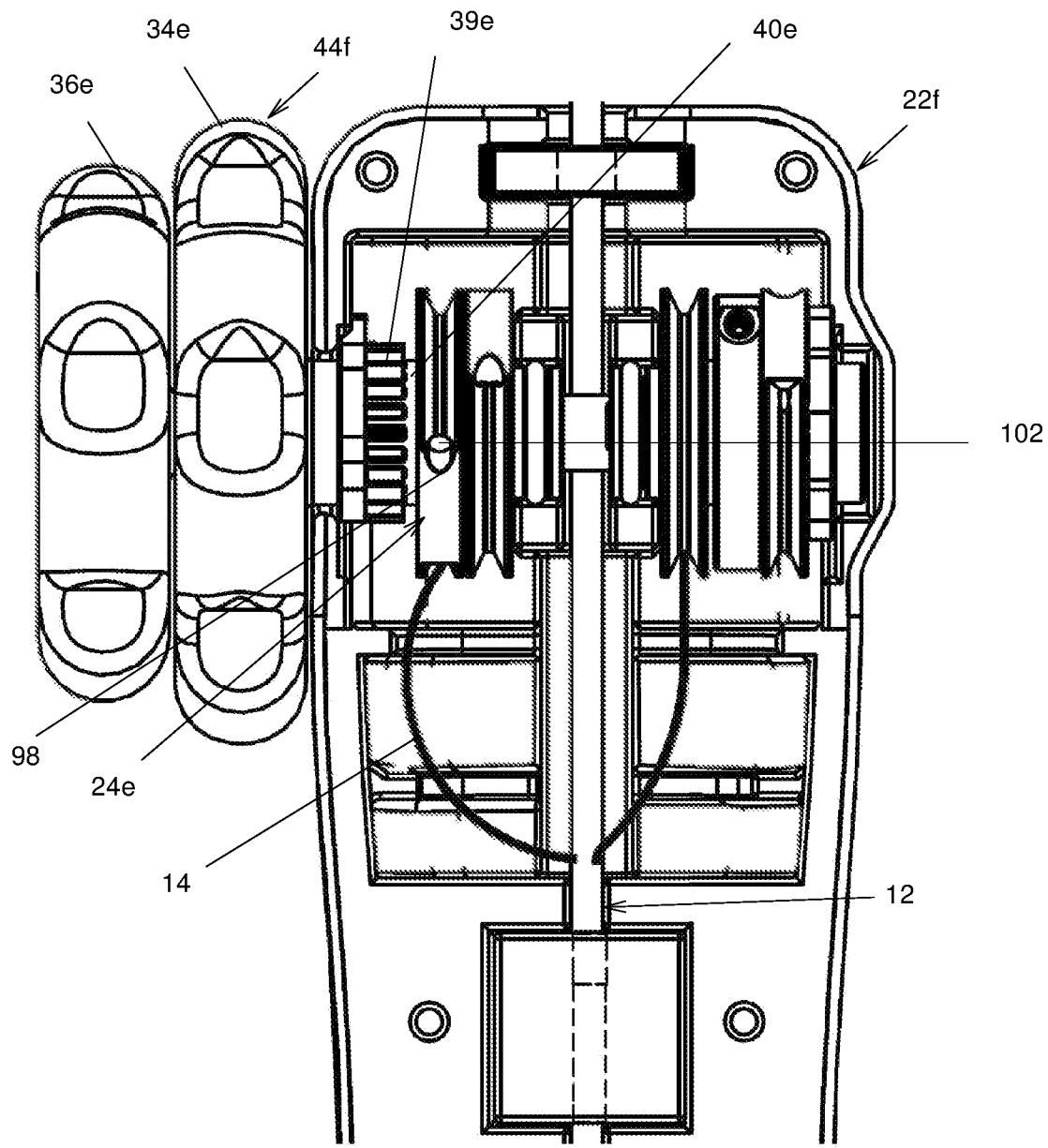
FIG. 32, in a top elevation view, illustrates a step in the assembly of the actuating assembly of FIG. 27.

Referring to FIG. 32, after having mounted the wire steered device 12 and the actuating assembly body 22 to each other, the first wheel 24e is moved in register with the intermediate section 40e. Then, the first steering wire 14 is inserted through the wire mounting aperture 98 until the proximal end of the first steering wire 14 protrudes through the wire mounting aperture 98 and the ferrule 102 is crimped to the free end of the first steering wire 14. In this configuration, the first steering wire 14 is typically relative loose but the steering wire 14 is prevented from being removed from the first wheel 24e by pulling on the steering wire 14 in a direction leading towards the wire steered device 12.

Figure 33:
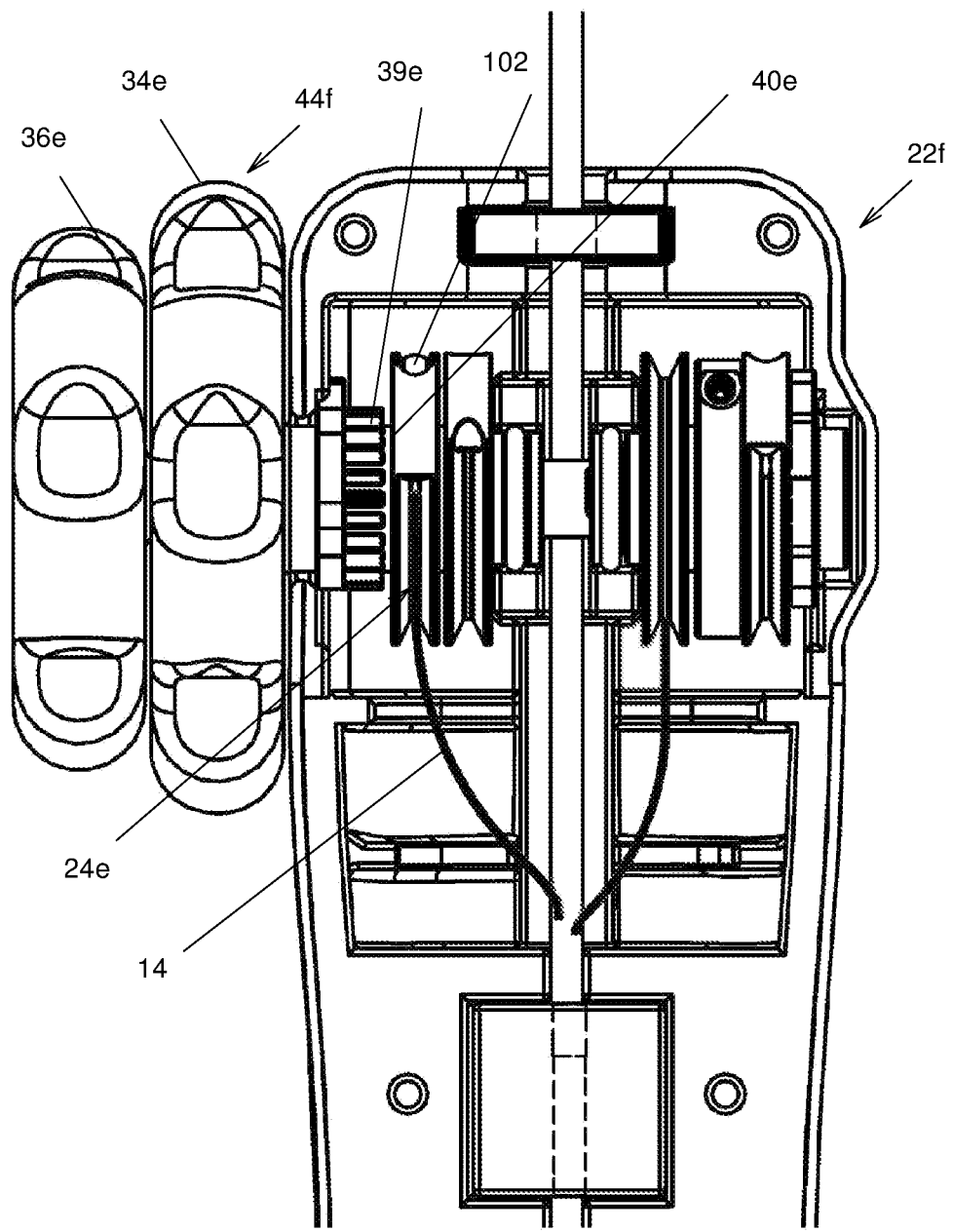
FIG. 33, in a top elevation view, illustrates another step in the assembly of the actuating assembly of FIG. 27.

Then, as seen in FIG. 33, the first wheel 24e is rotated manually in a suitable direction until the first steering wire 14 is sufficiently taut. The direction is such that tension is applied to the first steering wire 14 through the ferrule 102. The latter is received in a suitably shaped portion of the wire mounting aperture 98.

Figure 34:
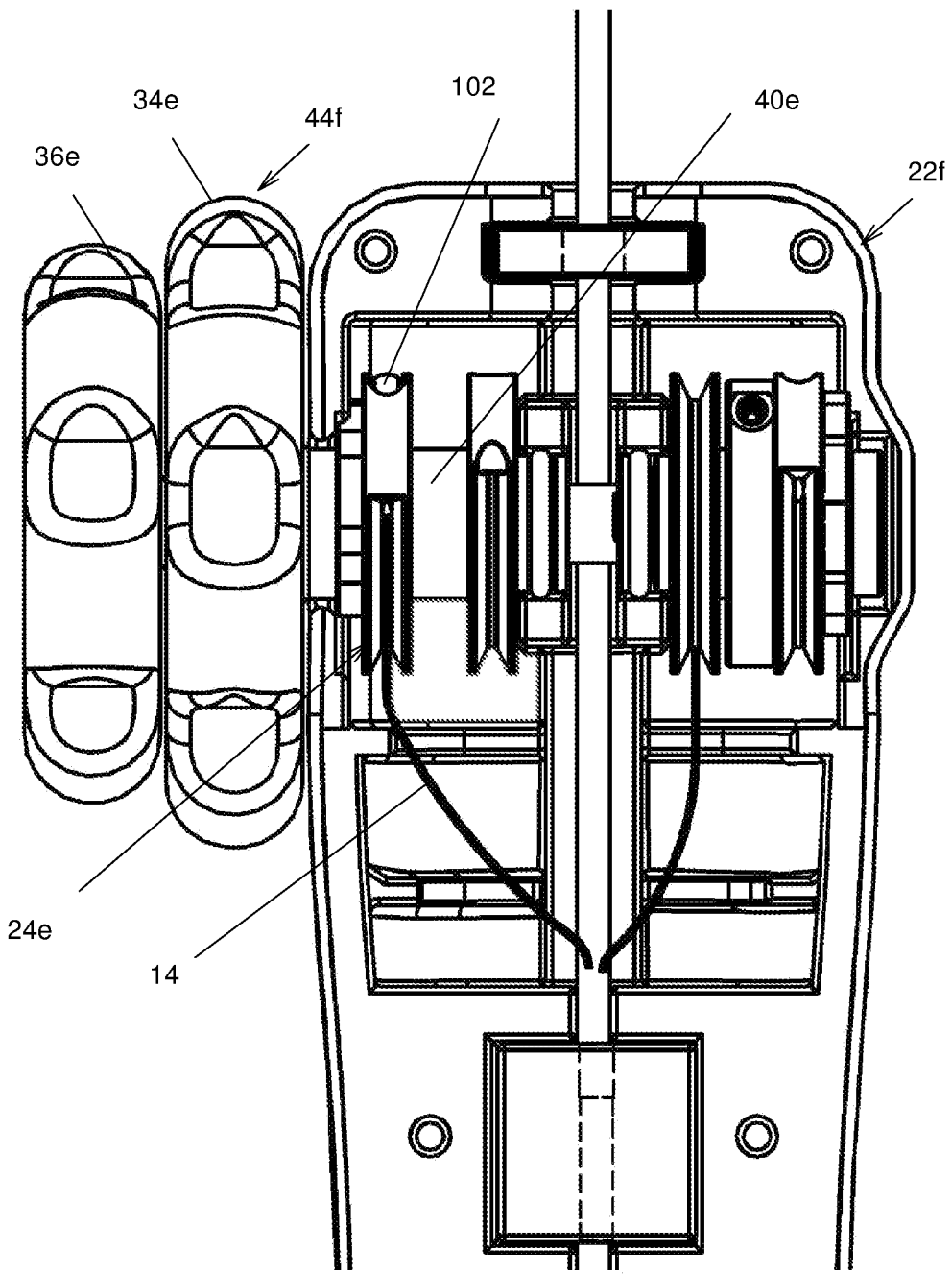
FIG. 34, in a top elevation view, illustrates yet another step in the assembly of the actuating assembly of FIG. 27.
Figure 35:
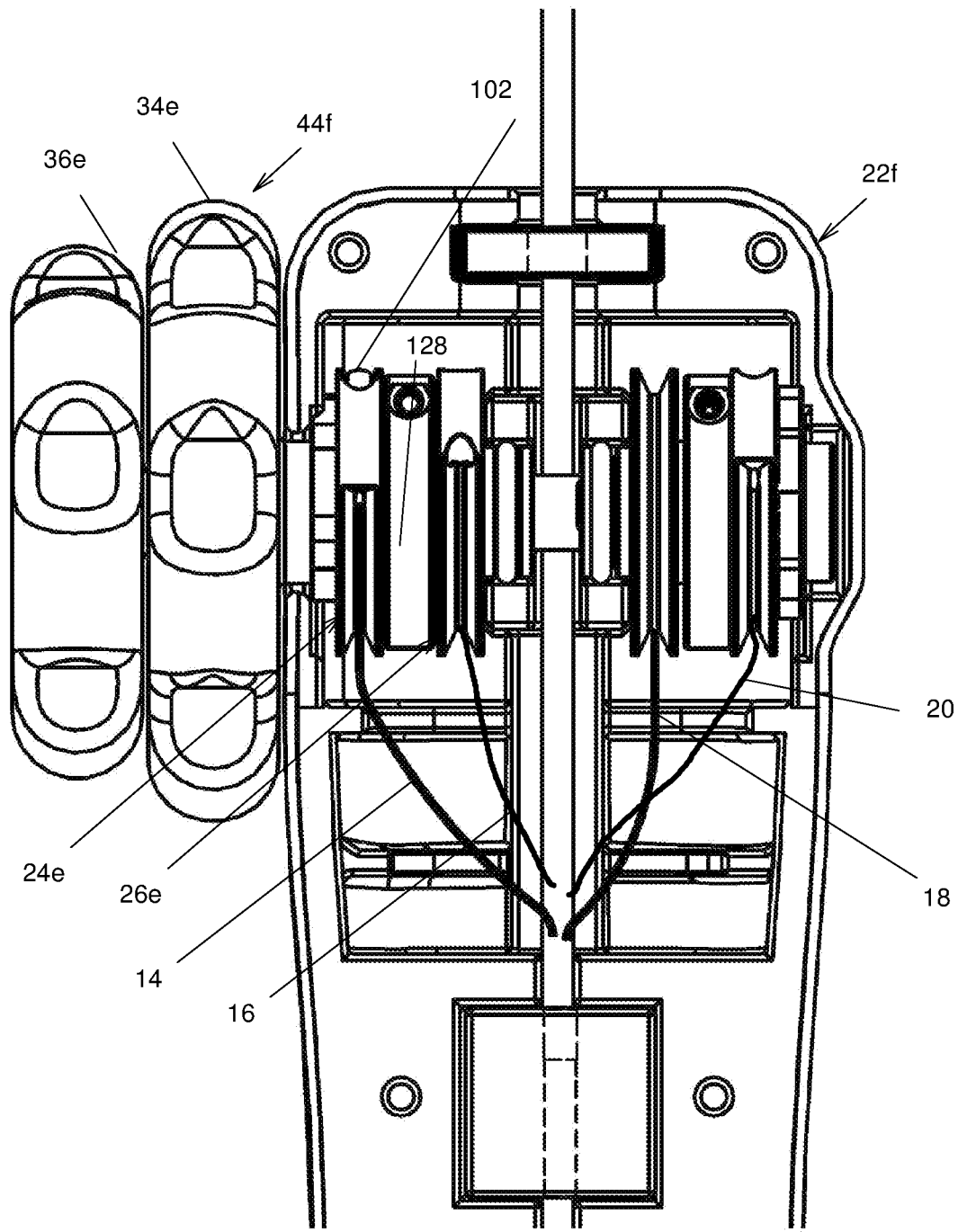
FIG. 35, in a top elevation view, illustrates yet another step in the assembly of the actuating assembly of FIG. 27.
Figures 36, 37:
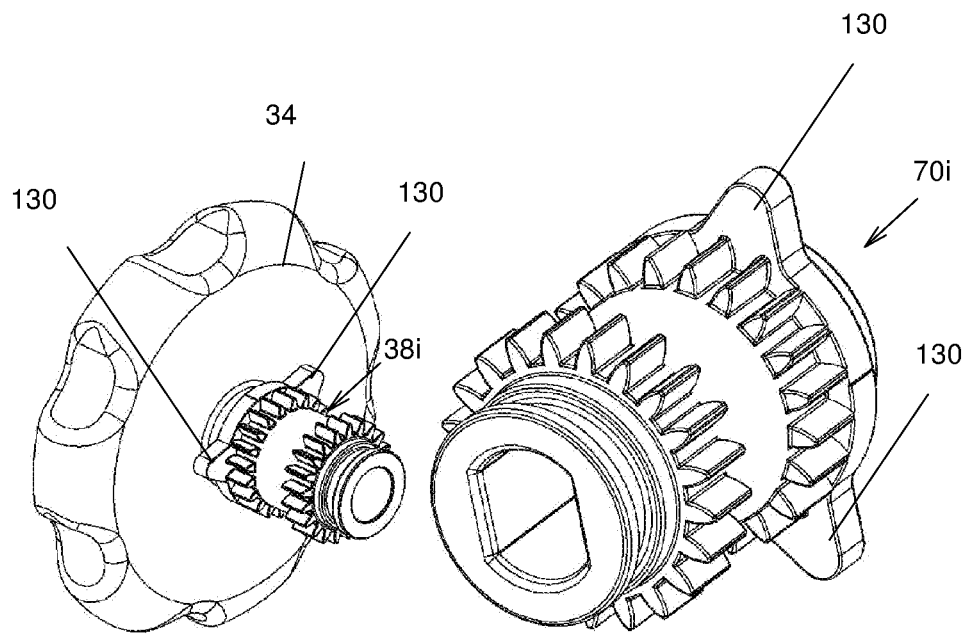
FIG. 36, in a perspective view, illustrates an alternative first axle and knob combination.
FIG. 37, in a perspective view, illustrates the first axle of FIG. 35.

In the next step, as see in FIG. 34, the first wheel 24e is inserted on the outer gear 39e while maintaining the first steering wire 14 taut, and, as seen in FIG. 35, the spacer 128 is mounted to the first axle 38f. This last step is typically performed only after the second steering wire 16 has been mounted to the second wheel 26e. Moving the first wheel 24e to the outer gear 39e secures the first wheel 24e to the first axle 38f through moving the first wheel 24e from a mounting position along the first axle 38f wherein the first wheel 24e is rotatable about the first axle 38e to an actuating position along the first axle 38e wherein the first wheel 24e engages the first axle 38f through mechanical interference. Mounting the spacer 128 to the first axle 38f locks the first and second wheels 24e and 26e to the first axle 38f so that the first and second wheels 24e and 26e are maintained in the actuating configuration.

Figure 38:
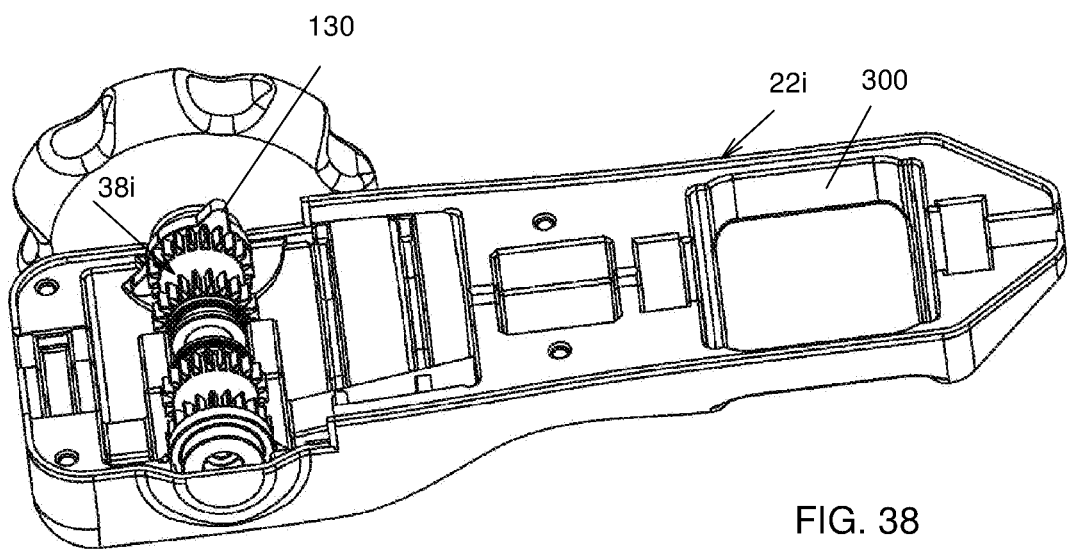
FIG. 38, in a perspective view, illustrates an actuating assembly incorporating the first axle and knob of FIG. 35.
Figure 39:
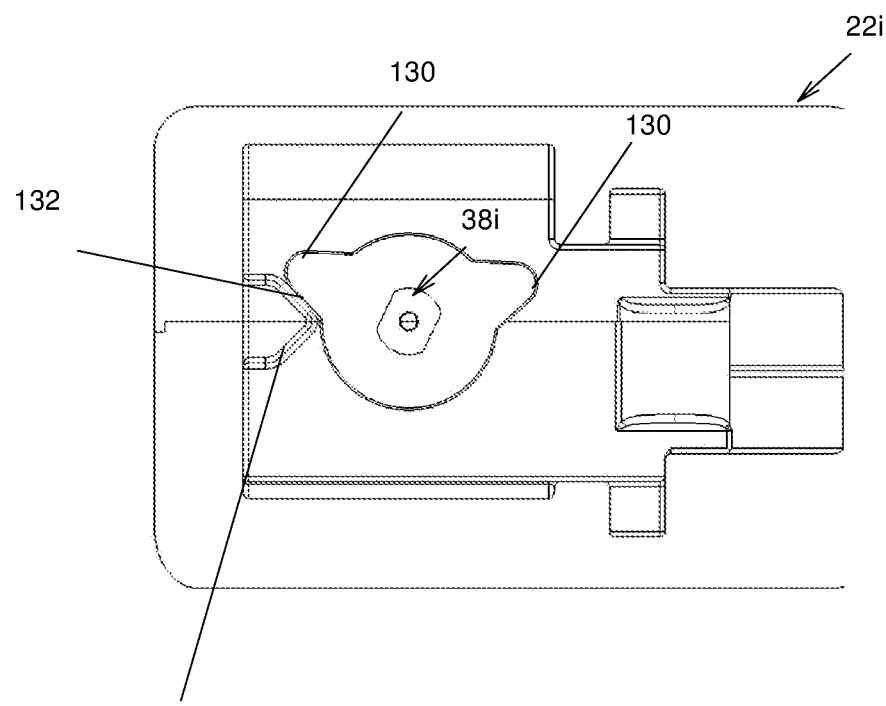
FIG. 39, in a side cross-section view, illustrates part of a body of the actuating assembly of FIG. 37 and the axle of FIG. 36 mounted thereto.
Figure 40:
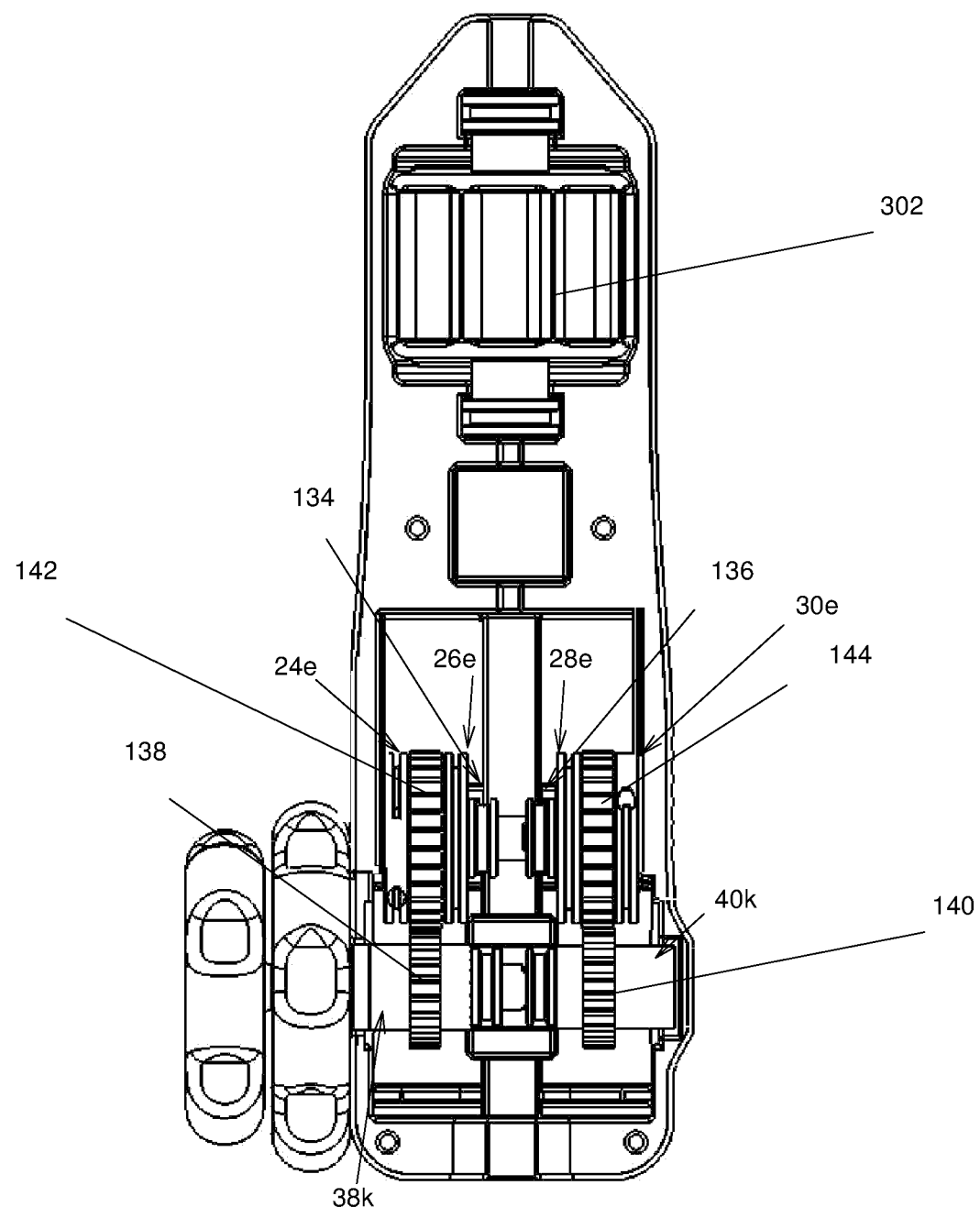
FIG. 40, in a top elevation view with parts removed, illustrates yet another alternative actuating assembly.
Figure 41:
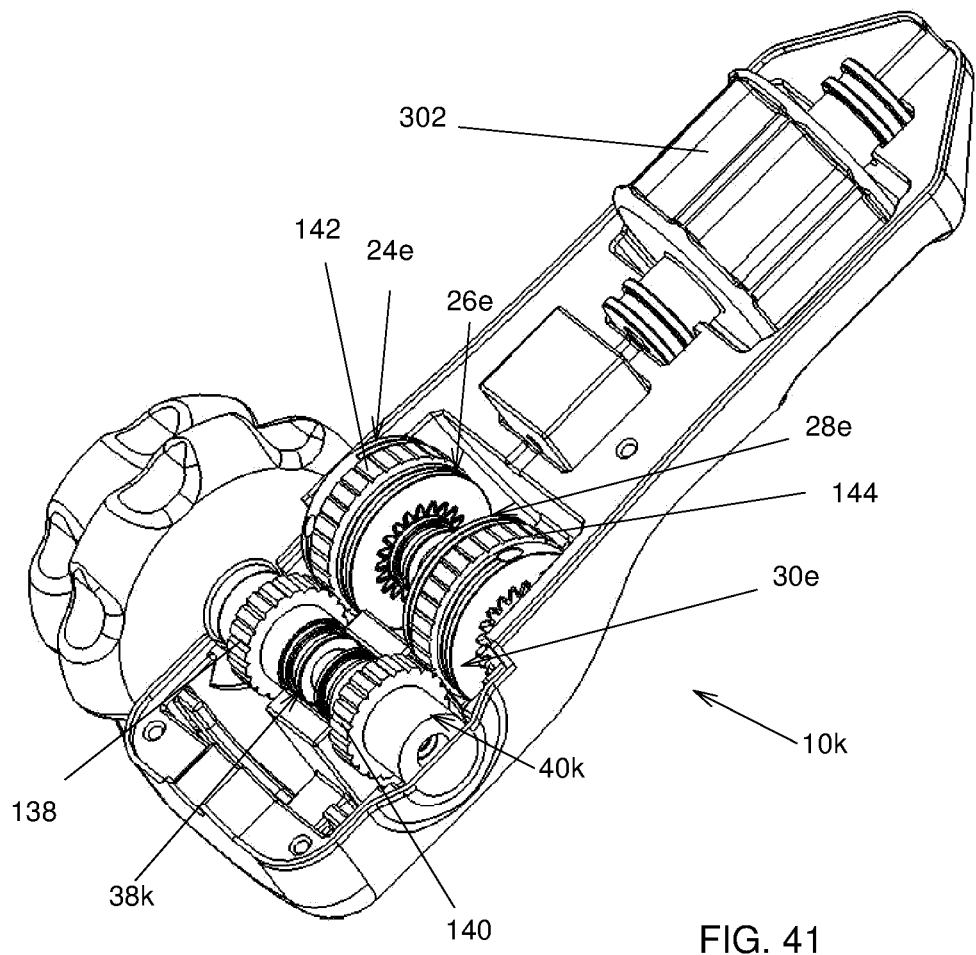
FIG. 41, in a perspective view with parts removed, illustrates the actuating assembly of FIG. 40.

In some embodiments, as seen for example in FIGS. 36 to 39, the first axle 38i is provided with a pair of stoppers 130. The stoppers 130 are provided adjacent the first knob 34 and take the form of protrusions that protrude from the remainder of circumferentially adjacent portions of the first knob 34. The stoppers 130 are positioned, configured and sized to abut corresponding abutment surfaces 132 formed in the actuating assembly body 22i at a corresponding desired end rotation range, as seen in FIG. 39. The stoppers 130 and abutment surfaces 132 are configured so that the first knob 34 and the first axle 38i may only be rotated about a predetermined angular range of motion relative to the actuating assembly body 22i, to limit the extent to which the steering wires 14 and 16 are moved. Similar stoppers 130 and similar abutment surfaces 132 may be provided for the effective portion 70i A seen in FIGS. 40 and 41, in yet other embodiments of actuating assemblies 10k, the wheels 24e, 26e, 28e and 30e are not mounted directly to the first and second axles 38 and 40, but are instead mounted to secondary axles 134 and 136 extending parallel to the first and second axles 38 and 40 and linked thereto through intermediate gears 138, 140, 142 and 144 secured for joint rotation respectively with the first axle 38k, second axle 40k, and the two secondary axles 134 and 136. The intermediate gears 138 and 142 intermesh, while the intermediate gears 140 and 144 intermesh. The manner in which the wheels 24e, 26e, 28e and 30e are coupled and mounted to the secondary axles 134 and 136 is similar to the manners of mounting the wheels 24e, 26e, 28e and 30e to the first and second axles 38e and 40e. The intermediate gears 138, 140, 142 and 144 may be used to increase resistance to motion of the first and second knobs 34 and 36 or to alter the sensitivity of the movements of the steering wires 14, 16, 18 and 20 relative to the rotation of the first and second knobs 34 and 36. As seen in FIG. 41, an auxiliary knob 302, or any other suitable structure, may be provided to actuate other functionalities of the catheter 12. For example, the knob 302 may be coupled to the catheter 12 to axially rotate a structure thereof, for example in implant a helicoidal anchor.

Figure 42:
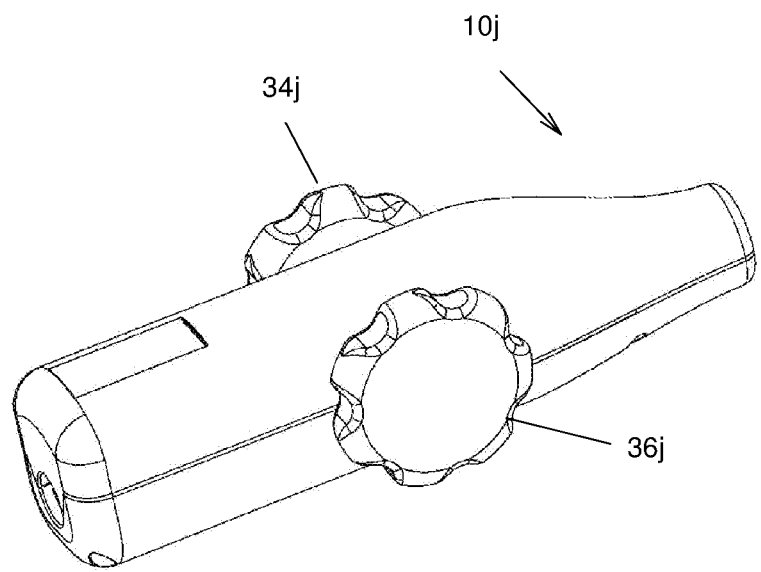
FIG. 42, in a perspective view, illustrates yet another actuating assembly.
Figure 43:
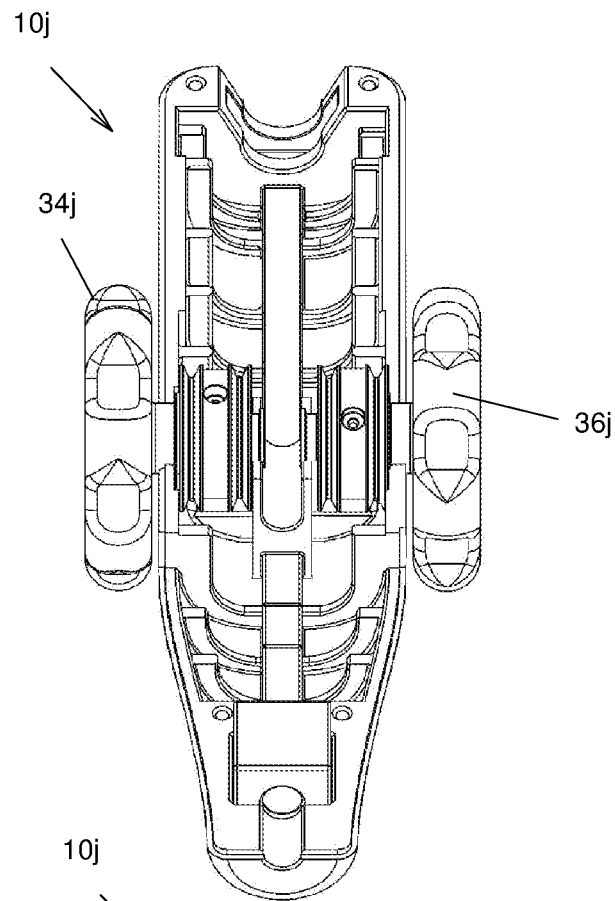
FIG. 43, in a perspective view with parts removed, illustrates the actuating assembly of FIG. 42.
Figure 44:
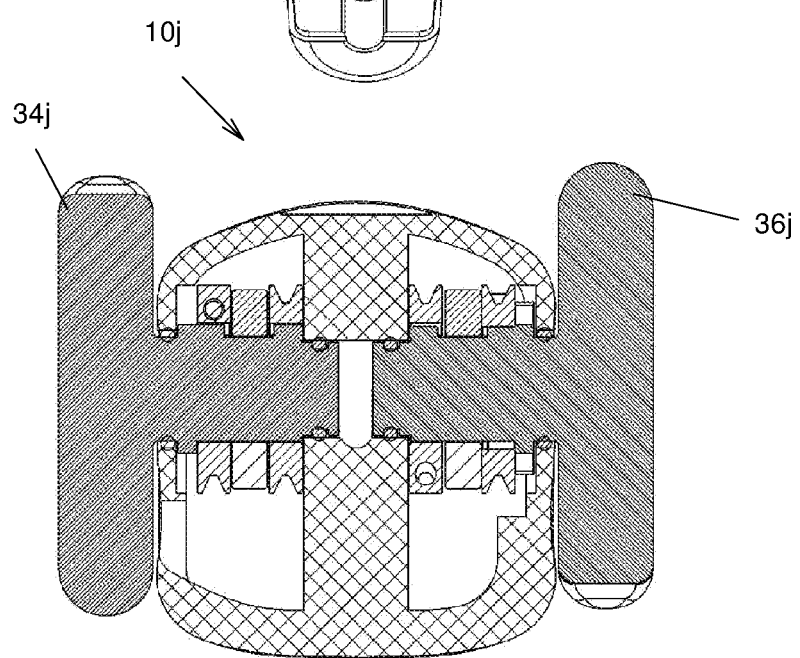
FIG. 44, in a front cross-section view along an axis of the first and second axles thereof, illustrates the actuating assembly of FIG. 42.
Figure 48:
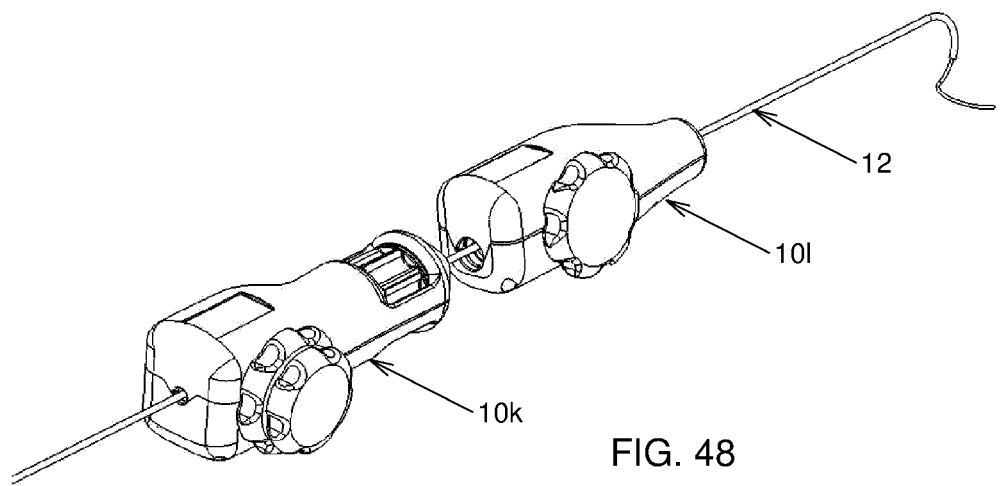
FIG. 48, in a perspective view, illustrates daisy chaining of the actuating assemblies of FIGS. 46 and 47.
Figure 46:
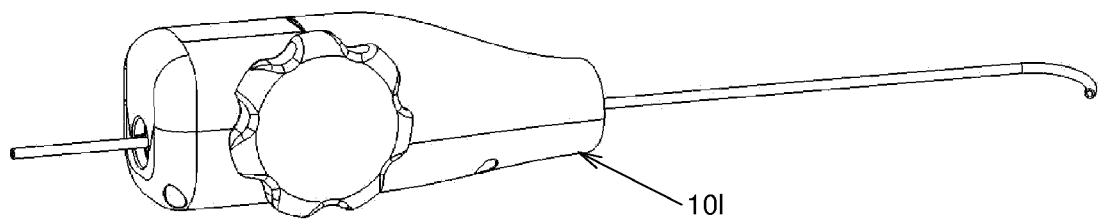
FIG. 46, in a perspective view, illustrates yet another actuating assembly.
Figure 47:
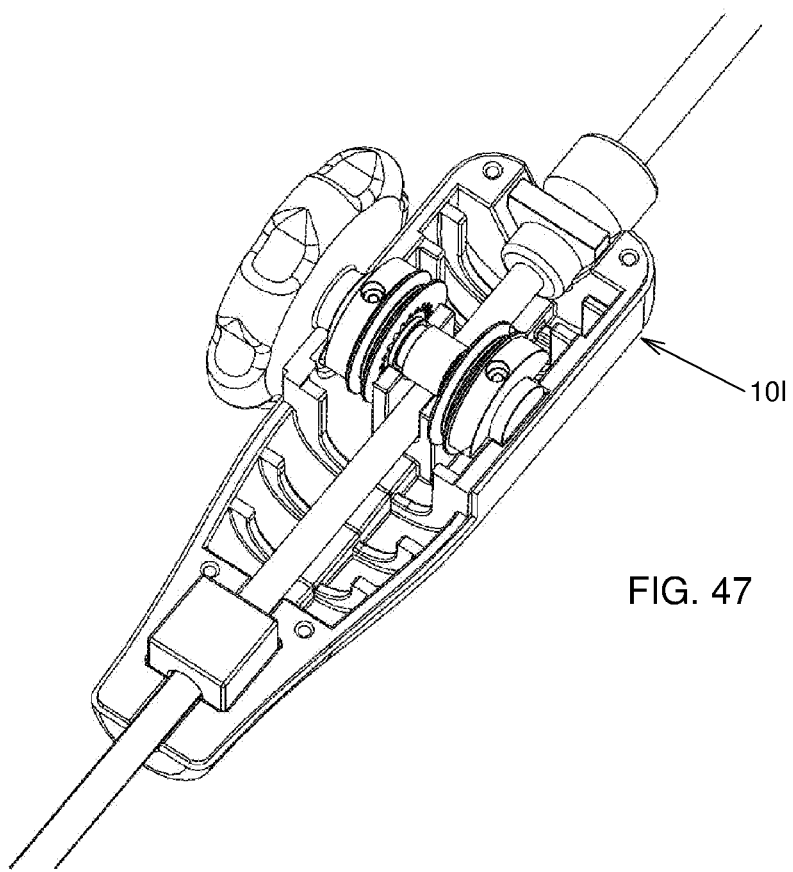
FIG. 47, in a perspective view with parts removed, illustrates the actuating assembly of FIG. 47.
Figure 49:
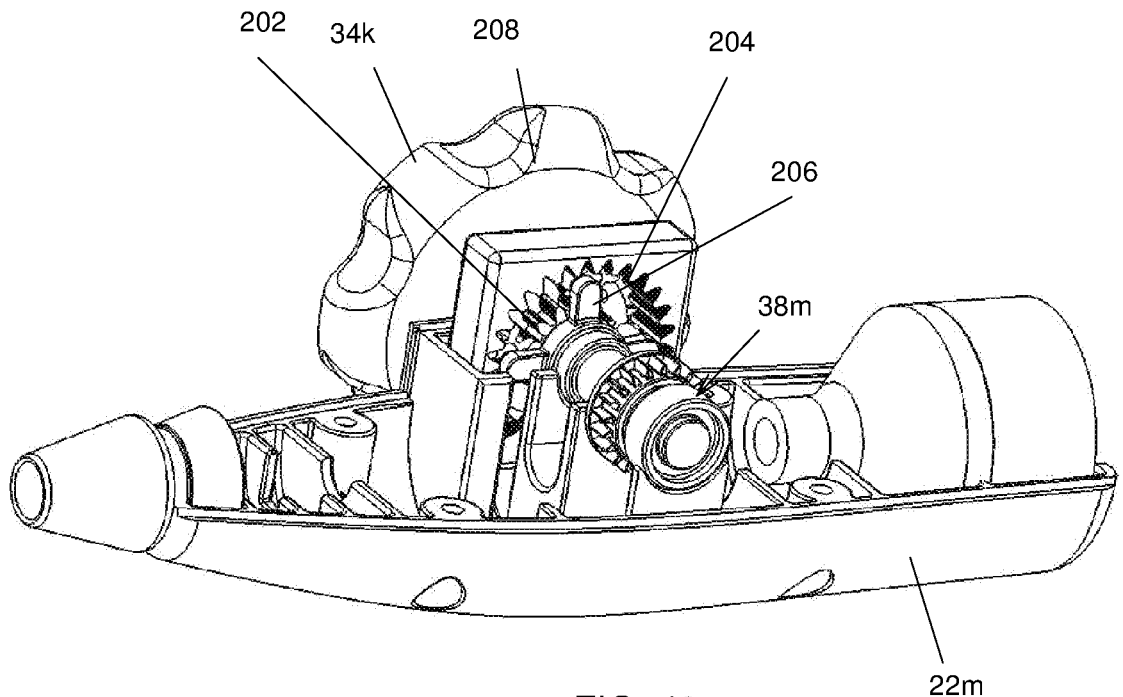
FIG. 49, in a perspective view with parts removed, illustrates yet another actuating assembly.
Figure 50:
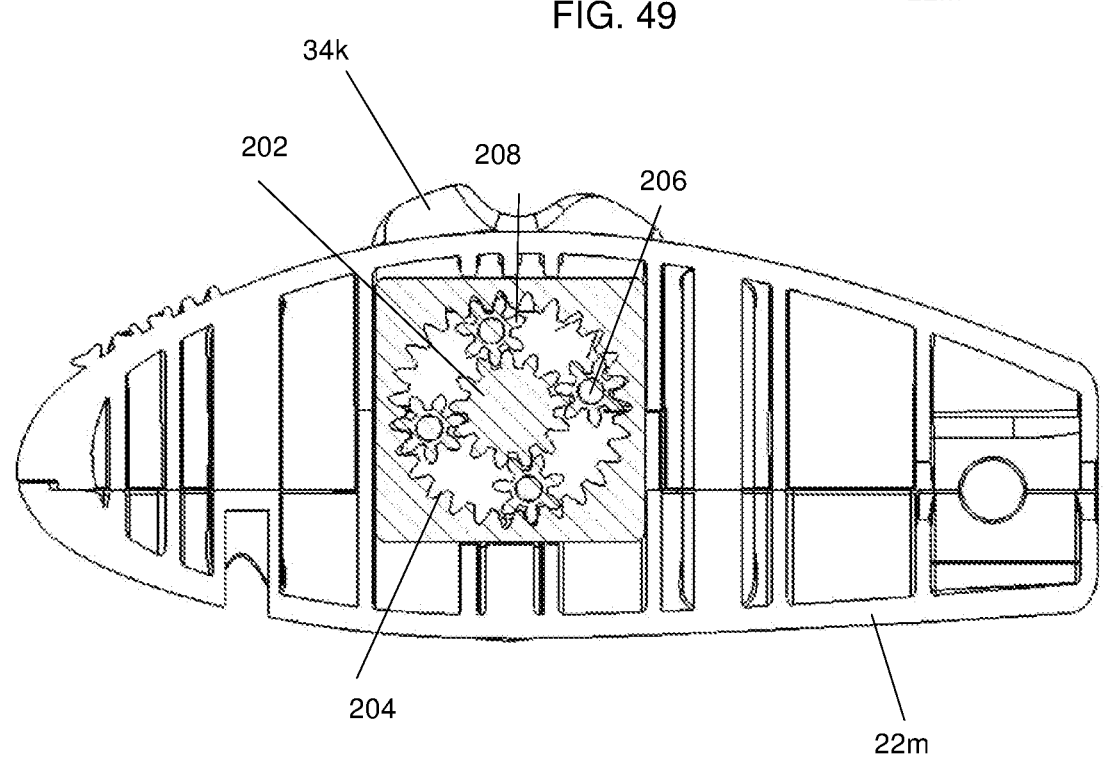
FIG. 50, in a side cross-section view taken midway through a planetary gear assembly thereof, illustrates the actuating assembly of FIG. 49.

In yet other embodiments, the first and second knobs 34j and 46j are provided on opposite sides of the actuating assembly 10j, as seen with respect to FIGS. 42 to 44, or in other planes, if suitable gears are used. In such cases, the first and second axles 38j and 40j are not concentric, but colinear. Also, the use of only a single knob is illustrated in FIGS. 46 and 47 for actuating assembly 10l. As seen in FIG. 48, the actuating assemblies, such as actuating assemblies 10k and 10l, may be cascaded, so that an inner catheter, provided inside an outer catheter, or a sheath, may be steered independently from the outer catheter, to add additional controlled degrees of freedom.

In some embodiments, as seen in FIG. 38 for example, a generally square aperture 300 may be provided in the actuating assembly body. In such embodiments, the catheter or other device to steer may be provided with an outer fixation component having a shape complementary to the aperture 300, such that the device to steer may be easily mounted to the actuating assembly body. The aperture 300 may also receive the auxiliary knob 302 when the latter is present. Also, in some embodiments the axis of rotation 32 may be offset from the longitudinal axis of the catheter.

The actuating assembly 10 may include other features, such as an axial knob 150, seen in FIG. 41 for example, configured to be coupled to a suitable structure of the catheter 12 to rotate this structure axially. The axial knob 150 is simply a knob mounted in the actuating assembly body 22 so as to be rotatable about an axis colinear with a longitudinal axis of the actuating assembly 10 and having a portion there of that is accessible through a suitable window formed in the actuating assembly body 22.

Figure 51:
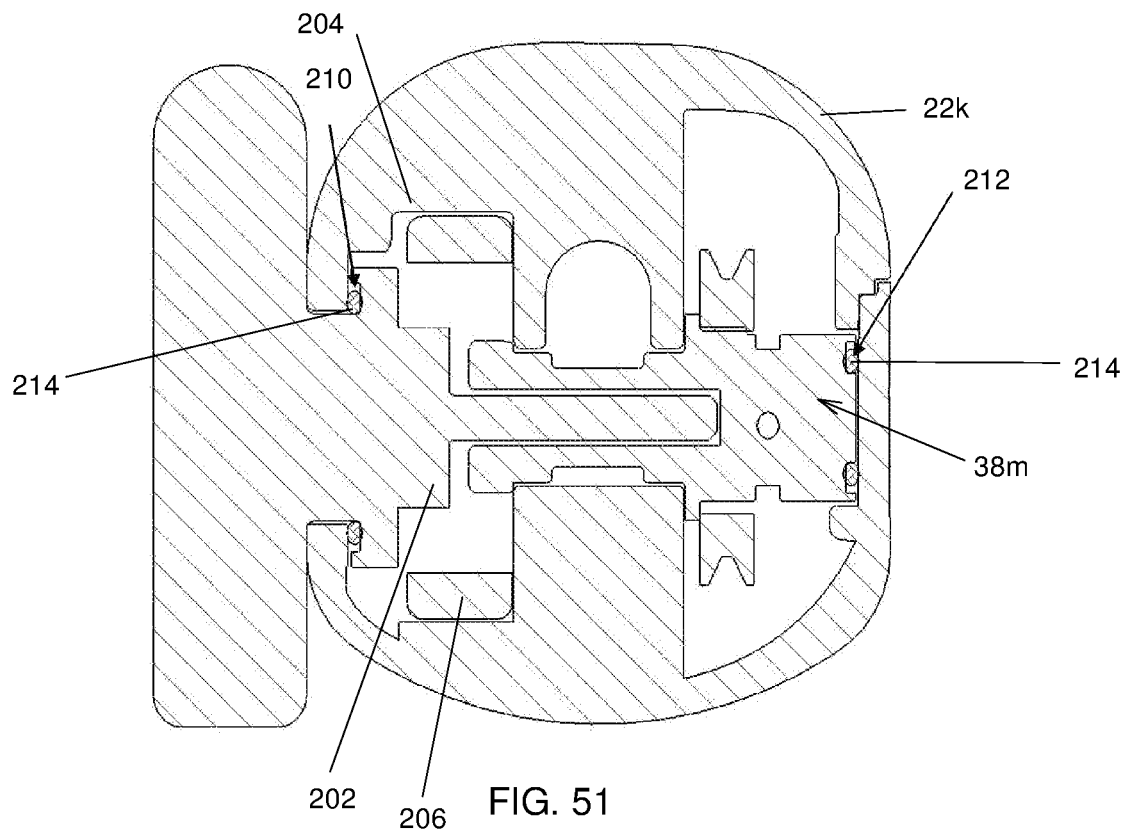
FIG. 51, in a side cross-section view taken midway through a planetary gear assembly thereof, illustrates the actuating assembly of FIG. 49.
Figure 52:
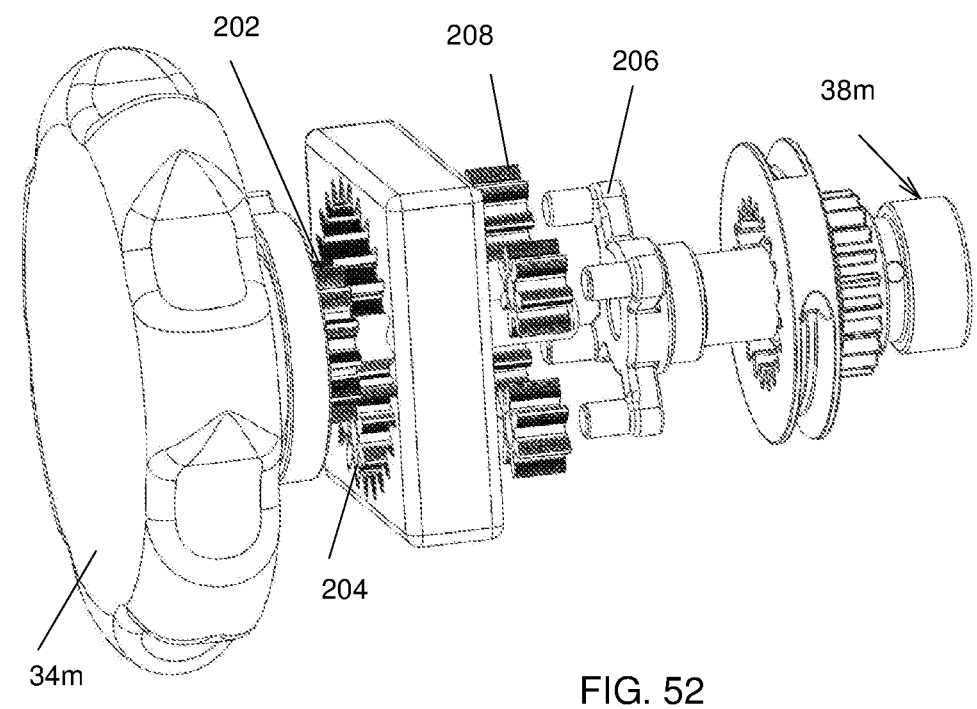
FIG. 52, in a perspective exploded view, illustrates a steering assembly part of the actuating assembly of FIG. 49.

FIGS. 49 to 52 illustrate characteristics of yet another manner of coupling an axle 38m and a knob 34m to each other and mounting the same to a body 22m. A planetary gearbox 200 is provided between the knob 34m and the first axle 38m, which achieves similar results to those achieved in the actuating assembly 10k. More specifically, a sun gear 202 is rotatable jointly along with the knob 34k. A ring gear 204 is provided static relative to the actuating assembly body 22k. A carrier 206 jointly rotatable along with the first axle 38*m* supports planet gears 208 provide between the sun and ring gears 202 and 204. Thus, rotating then knob 34*m* will result in rotation of the carrier 206 around the sun gear 202, which will in turn rotate the first axle 38*m*. In some embodiments, as seen in FIG. 51, annular grooves 210 and 212 facing axially receive each a resiliently deformable O-ring 214 between the actuating assembly body 22*m* and respectively the knob 34*m* and axle 38*m* to provide friction that resists slightly rotation of the knob 34*m*. In such embodiments, one rotation of the bob 34*m* does not result in exactly one rotation of the axle 38*m*, which allows in some embodiments to reduce significantly or eliminate any backlash, allowing a more precise steering mechanism.

Figure 53:
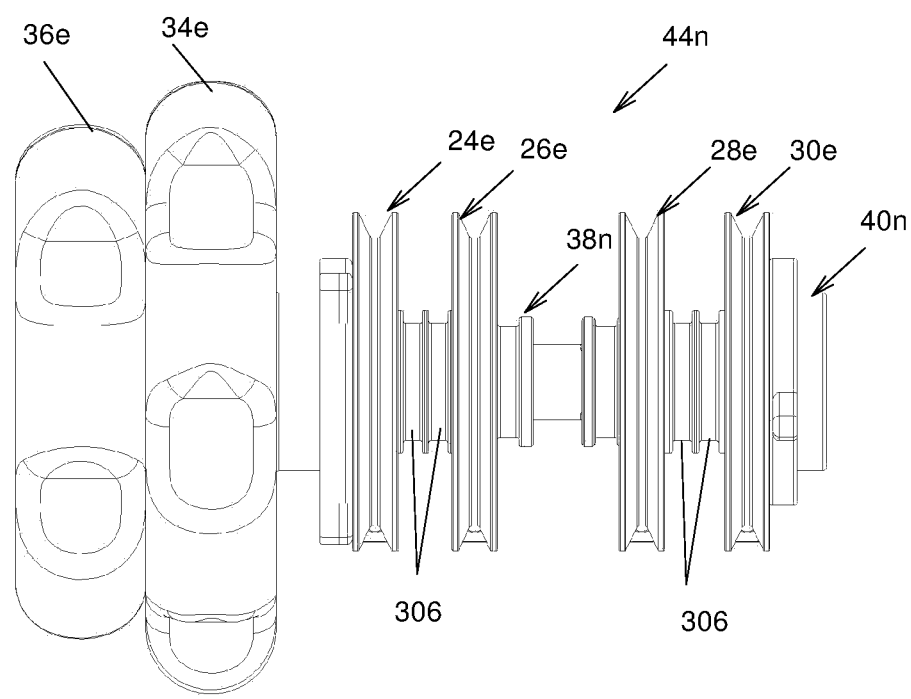
FIG. 53, in a side elevation view, illustrates yet another steering assembly with lock pins thereof omitted.
Figure 54:
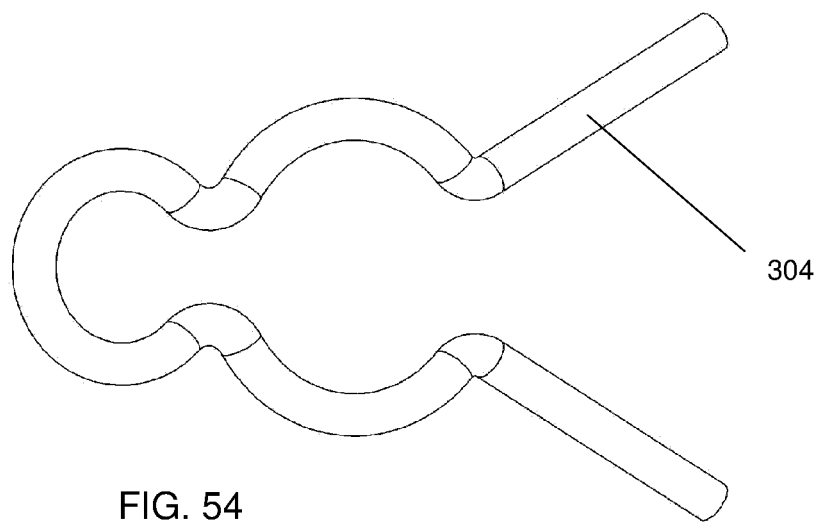
FIG. 54, in a side elevation view, illustrates lock pin part of the locking assembly of FIG. 53.
Figure 55:
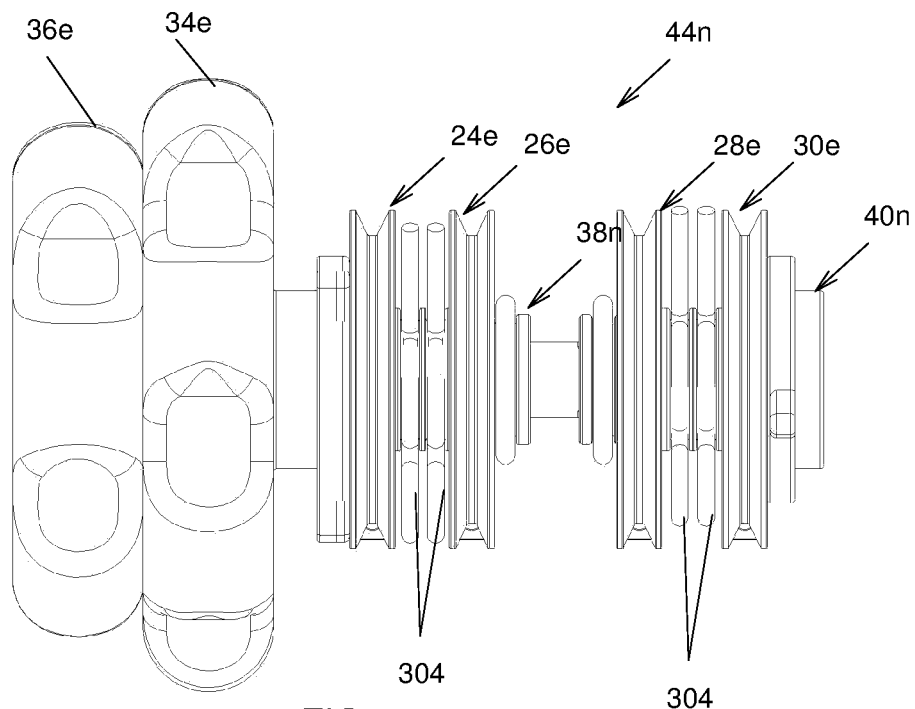
FIG. 55, in a side elevation view, illustrates the steering assembly of FIG. 53 with lock pins of FIG. 55 secured thereto.

FIGS. 53 to 55 illustrate yet another embodiment of an actuating assembly 44*n* similar to the actuating assembly 44*e*, except that the insert 128 is replaced by lock pins 304, better seen in FIG. 54, that can be selectively snapped to the first and second axles 38*n* and 40*n* to lock the wheels 24*e*, 26*e*, 28*e* and 30*e*. To that effect, the first and second axles 38*n* and 40*n* each define a pair of grooves 306 (seen in FIG. 53), each configured for snappingly receiving one of the lock pins 304 thereonto so that the wheels 24*e*, 26*e*, 28*e* and 30*e* are maintained in the wheel actuating configurations, as seen in FIG. 55. A predetermined force is then required to remove the lock pins 304, so that such removal cannot occur accidentally.

Although the present invention has been described hereinabove by way of exemplary embodiments thereof, it will be readily appreciated that many modifications are possible in the exemplary embodiments without materially departing from the novel teachings and advantages of this invention. Accordingly, the scope of the claims should not be limited by the exemplary embodiments, but should be given the broadest interpretation consistent with the description as a whole.

What is claimed is:

1. An actuating assembly for a wire steered device, the actuating assembly comprising:
   an axle defining a rotation axis; and
   a wheel mounted to the axle and rotatable about the rotation axis, the wheel including a wire attachment configured to control movement of a steering wire configured to move the wire steered device;
   wherein the wheel is movable between a mounting configuration, where the wheel remains on the axle while being rotatable about the rotation axis independently of the axle, and an actuating configuration, where the wheel is mounted to the axle and jointly rotatable with the axle about the rotation axis,
   wherein, in the mounting configuration, the wheel is configured to wind the steering wire therearound and to tension the steering wire to an operational tension.

2. The actuating assembly of claim 1, wherein in the actuating configuration, the wheel and the axle are jointly rotatable to wind and unwind the steering wire on and from the wheel to steer the wire steered device.

3. The actuating assembly of claim 1, further comprising a biasing element configured to bias the wheel towards the actuating configuration through a biasing force;
   wherein the wheel is movable to the mounting configuration by pushing against the biasing force.

4. The actuating assembly of claim 1, wherein the steering wire is a flat wire.

5. The actuating assembly of claim 1, further comprising an actuator configured to rotate the axle about the rotation axis.

6. The actuating assembly of claim 1, further comprising a second wheel mounted to the axle and rotatable about the rotation axis, the second wheel including a second wire attachment for attaching a second steering wire; wherein the second steering wire is configured to be wound around the second wheel.

7. The actuating assembly of claim 6, wherein, when the steering wire includes a ferrule, tension is at least partially applied to the steering wire through the ferrule.

8. The actuating assembly of claim 1, further comprising an auxiliary knob configured to actuate a peripheral attachment coupled to the wire steered device.

9. The actuating assembly of claim 8, wherein the peripheral attachment is an anchor.

10. The actuating assembly of claim 9, wherein actuating the peripheral attachment includes axially rotating the anchor.

* * * * *